United States Patent
Van Der Velde et al.

(10) Patent No.: US 10,455,451 B2
(45) Date of Patent: Oct. 22, 2019

(54) IDLE MODE LOAD BALANCING

(71) Applicant: Samsung Electronics Co., Ltd., Gyeonggi-do (KR)

(72) Inventors: Himke Van Der Velde, Middlesex (GB); Gerardus Johannes Petrus Van Lieshout, Middlesex (GB)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/748,464

(22) PCT Filed: Apr. 25, 2016

(86) PCT No.: PCT/KR2016/004306
§ 371 (c)(1),
(2) Date: Jan. 29, 2018

(87) PCT Pub. No.: WO2017/018638
PCT Pub. Date: Feb. 2, 2017

(65) Prior Publication Data
US 2018/0220330 A1    Aug. 2, 2018

(30) Foreign Application Priority Data

Jul. 29, 2015 (GB) .................................. 1513357.2

(51) Int. Cl.
*H04W 28/08* (2009.01)
*H04W 76/27* (2018.01)
(Continued)

(52) U.S. Cl.
CPC ........... *H04W 28/08* (2013.01); *H04W 24/08* (2013.01); *H04W 28/0284* (2013.01);
(Continued)

(58) Field of Classification Search
CPC .. H04L 47/10; H04W 28/02; H04W 28/0205; H04W 28/021; H04W 28/0247;
(Continued)

(56) References Cited

U.S. PATENT DOCUMENTS 6,473,403 B1 * 10/2002 Bare ....................... H04L 45/12
370/236
9,755,984 B1 * 9/2017 Feroz .................... H04L 43/026
(Continued)

FOREIGN PATENT DOCUMENTS

WO    WO 2006065199    6/2006

OTHER PUBLICATIONS

Alcatel-Lucent, Verizon, "Idle UE Distribution in Macro Only System and HetNets", R2-142495, 3GPP TSG-RAN WG2 Meeting #86, May 19-23, 2014, 6 pages.
(Continued)

*Primary Examiner* — Sharad Rampuria
(74) *Attorney, Agent, or Firm* — The Farrell Law Firm, P.C.

(57) ABSTRACT

A method for performing an idle mode redistribution evaluation by a mobile device in a mobile communication network. The method comprises: determining a plurality of redistribution targets, each redistribution target corresponding to a different frequency and comprising at least one cell within which the mobile device can camp on in idle mode in the wireless communication network; identifying, using information received from within a particular cell of the wireless communication network, at least one redistribution factor, each redistribution factor corresponding to a redistribution target; determining whether to move to one of the redistribution targets based on the at least one redistribution factor; wherein a redistribution factor for a redistribution target indicates a proportion of mobile devices currently (Continued)

distributed to the particular cell which are intended to camp on a cell corresponding to that redistribution target; and wherein identifying at least one redistribution factor comprises determining, for each redistribution target, whether a redistribution factor is specified for a first cell corresponding to that redistribution target, and if so setting the redistribution factor for the first cell as the only redistribution factor associated with that redistribution target. Also described is a mobile device arranged to implement the method.

17 Claims, 5 Drawing Sheets

(51) Int. Cl.
  *H04W 24/08* (2009.01)
  *H04W 28/02* (2009.01)
  *H04W 72/06* (2009.01)
  *H04W 72/08* (2009.01)
(52) U.S. Cl.
  CPC .......... *H04W 72/06* (2013.01); *H04W 72/08* (2013.01); *H04W 76/27* (2018.02)
(58) Field of Classification Search
  CPC ......... H04W 28/0252; H04W 28/0257; H04W 28/0263; H04W 28/0268; H04W 28/0273
  See application file for complete search history.

(56) References Cited

U.S. PATENT DOCUMENTS

| | | |
|---|---|---|
| 2005/0288017 A1* | 12/2005 | Doumenc ....... H04W 36/00835 455/435.3 |
| 2008/0220784 A1* | 9/2008 | Somasundaram .......................... H04W 36/0085 455/437 |
| 2010/0304747 A1 | 12/2010 | Kazmi et al. |
| 2011/0250891 A1 | 10/2011 | Zou et al. |
| 2013/0336110 A1 | 12/2013 | Sridhar et al. |
| 2014/0004862 A1 | 1/2014 | Ekemark |
| 2014/0024382 A1* | 1/2014 | Zou ....................... H04W 16/08 455/445 |

OTHER PUBLICATIONS

Itri, "The Idle Mode UE Distribution for Multicarrier Environment", R2-152357, 3GPP TSG RAN WG2 #90, May 25-29, 2015, 3 pages.
European Search Report dated Jun. 11, 2018 issued in counterpart application No. 16830672.8-1215, 10 pages.
PCT/ISA/210 Search Report issued on PCT/KR2016/004306 (pp. 3).
PCT/ISA/237 Written Opinion issued on PCT/KR2016/004306 (pp. 5).

* cited by examiner

[Fig. 1]
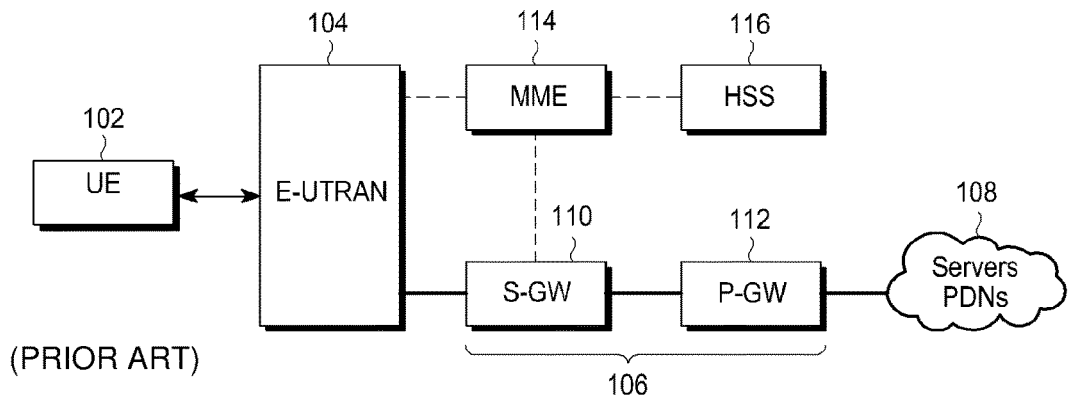
(PRIOR ART)
[Fig. 2]
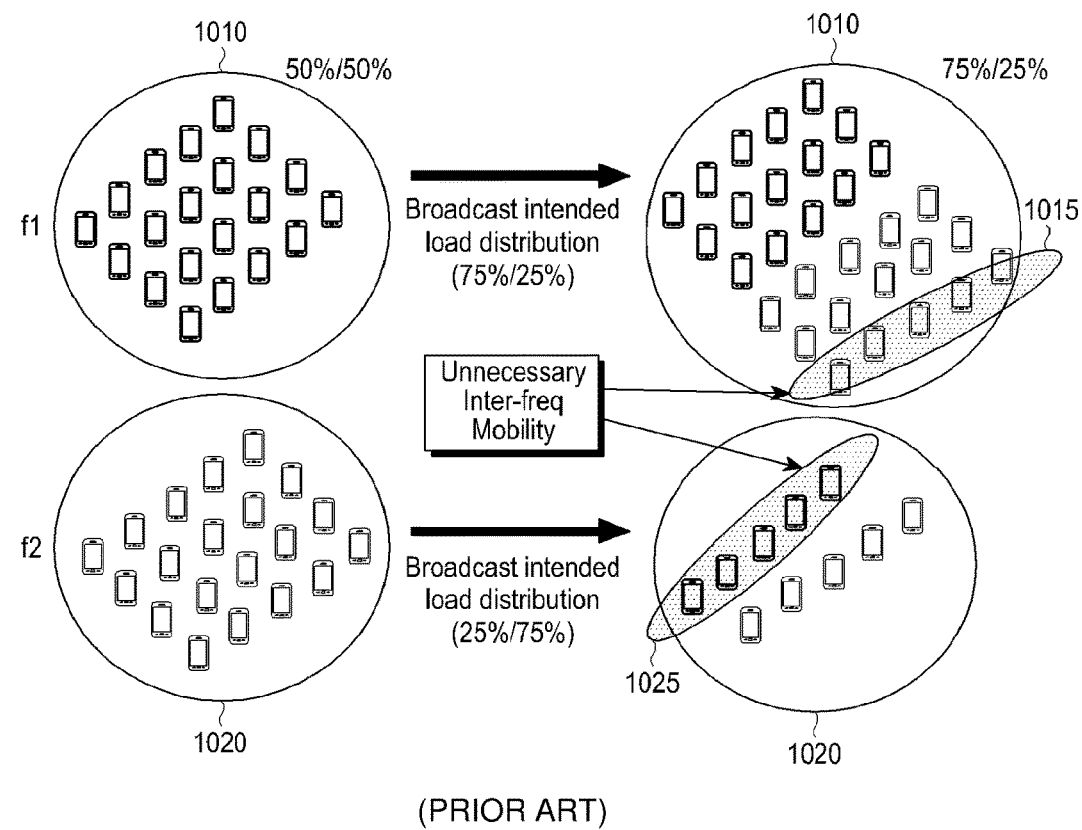
(PRIOR ART)

[Fig. 3]
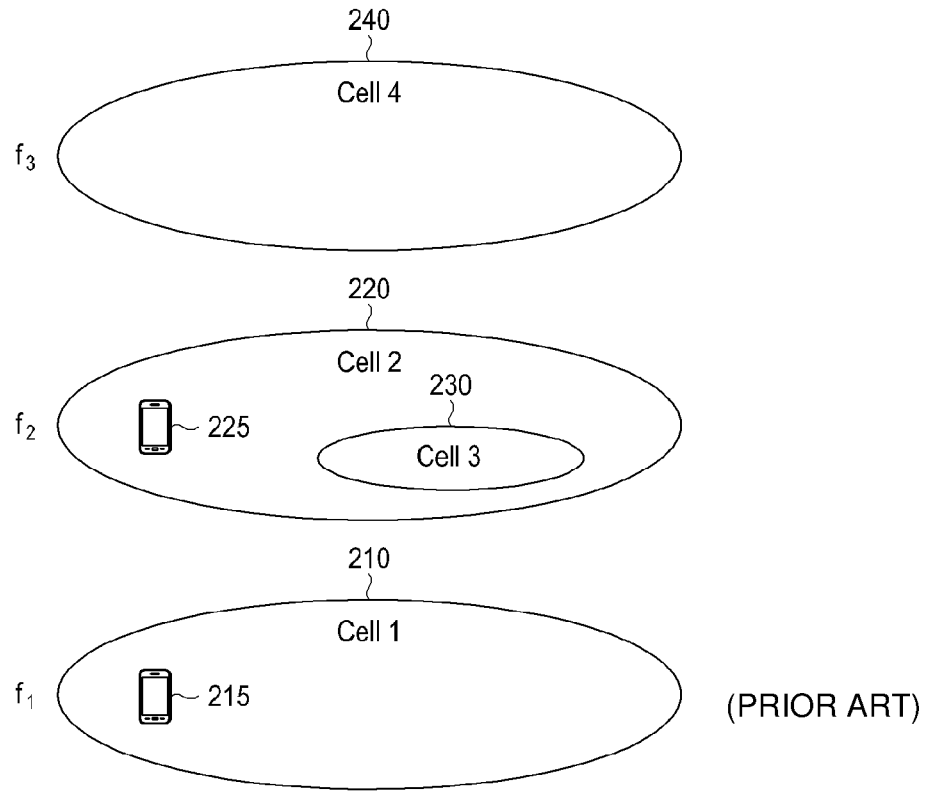
(PRIOR ART)
[Fig. 4]
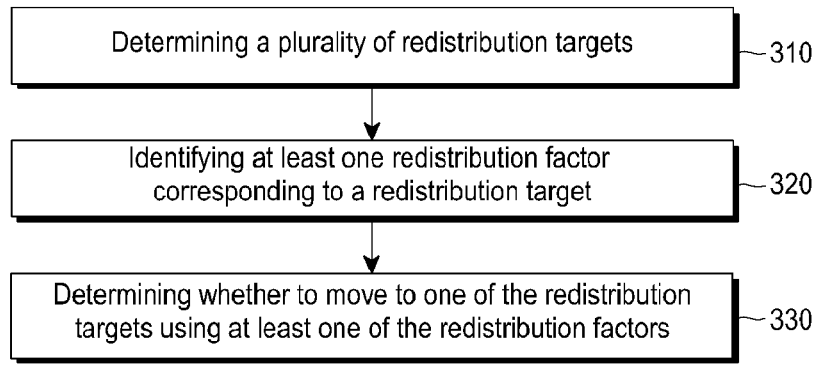

[Fig. 5]
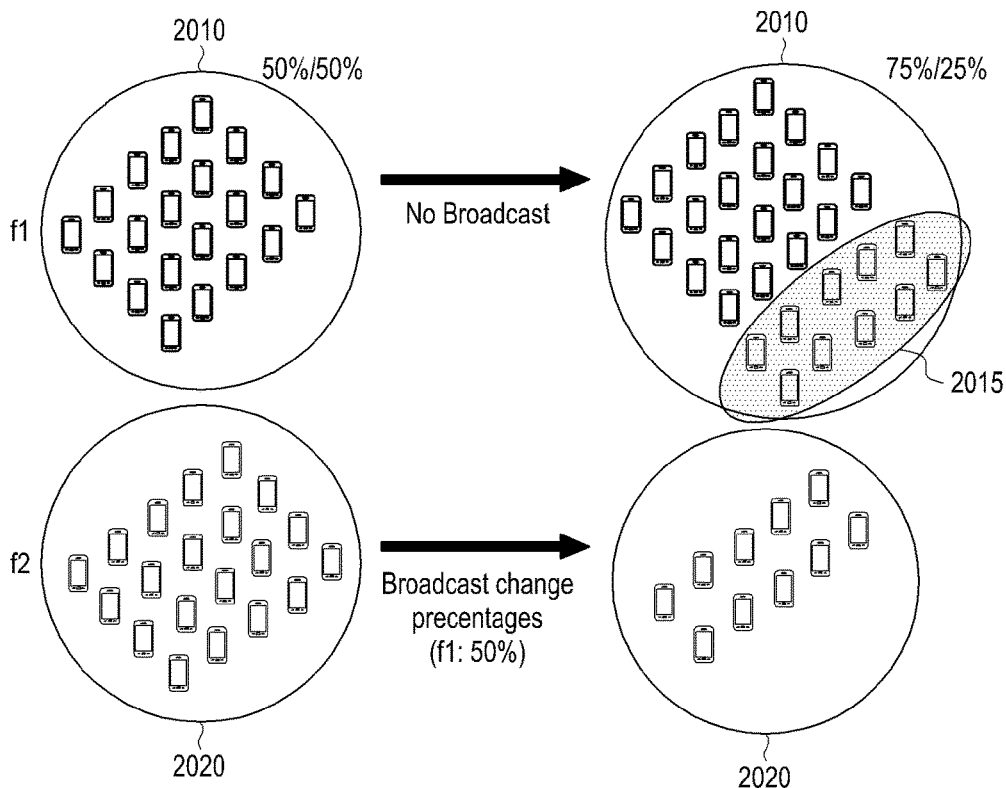
[Fig. 6]
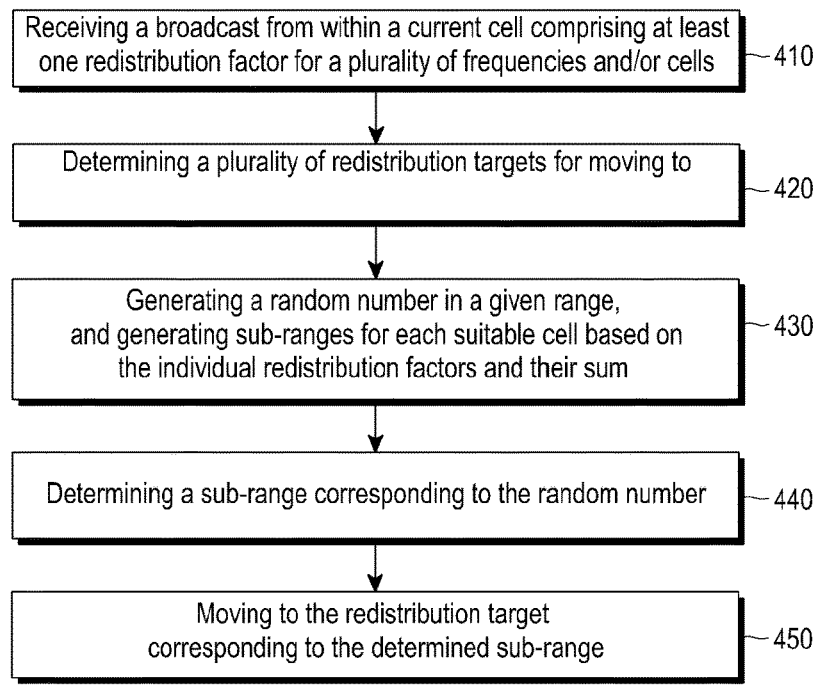

[Fig. 7]
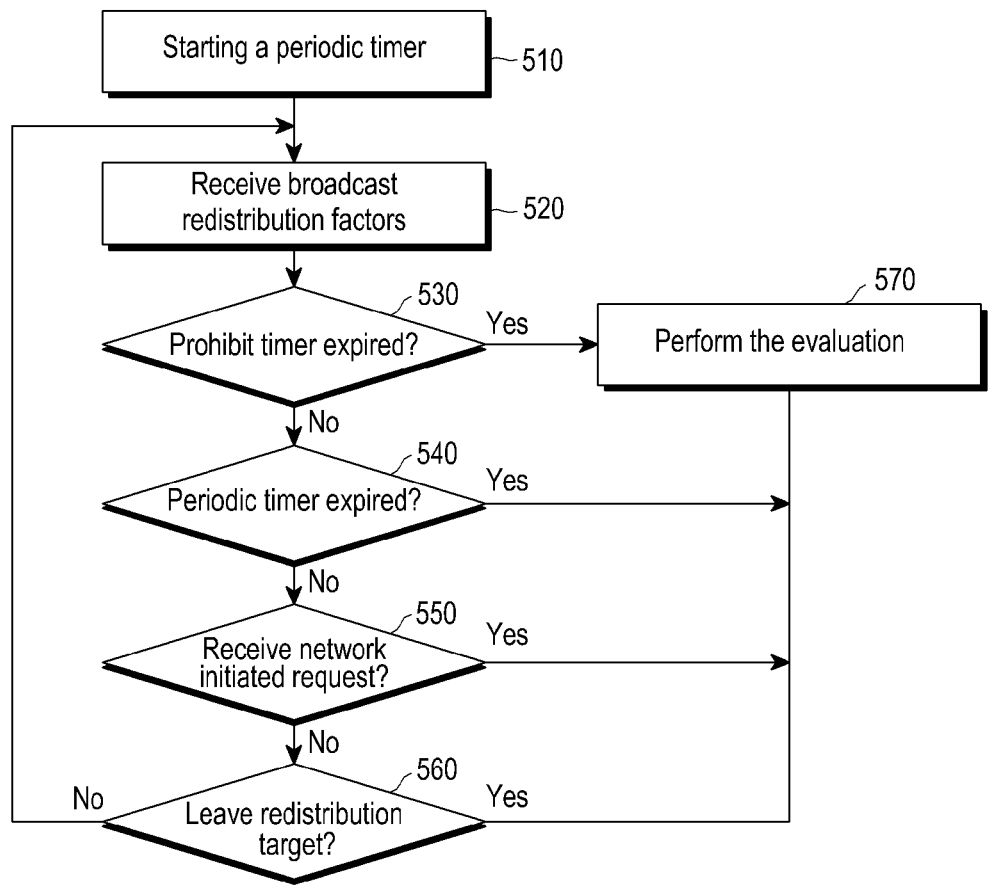

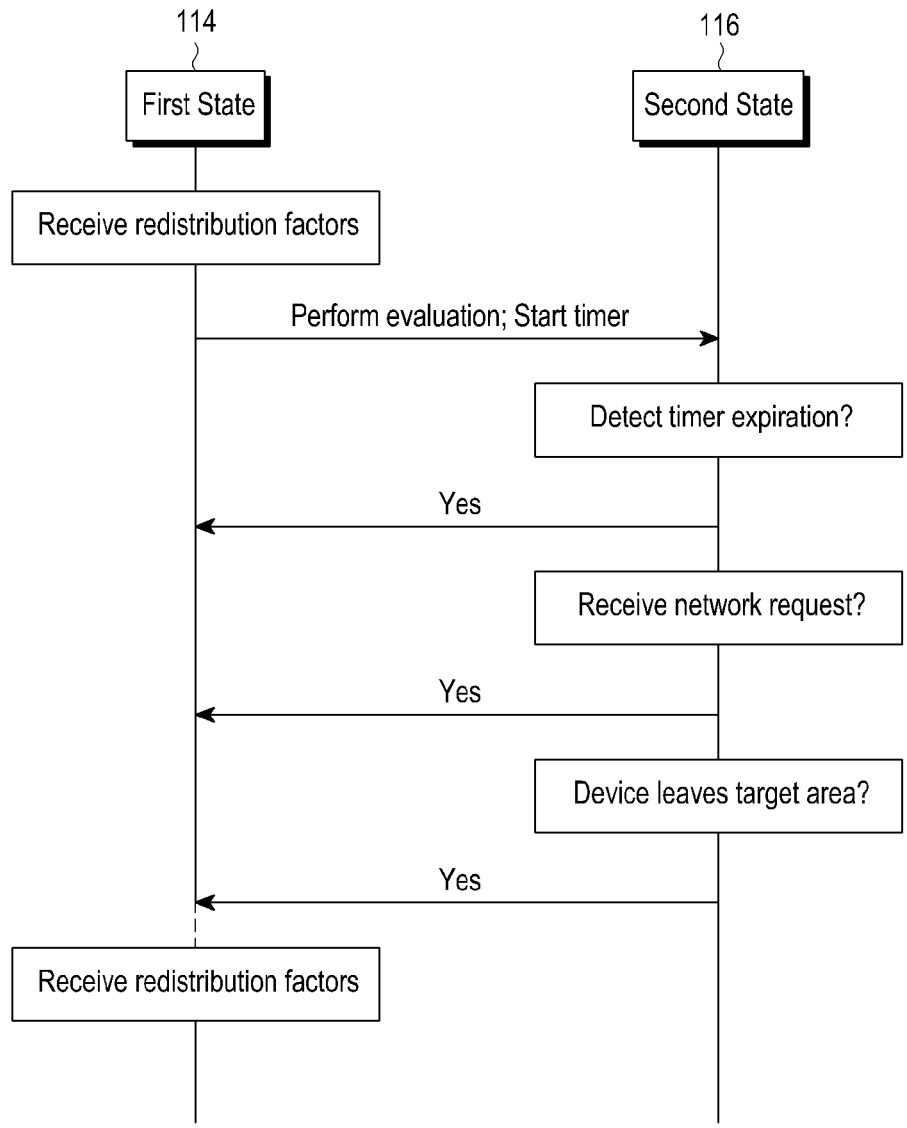
[Fig. 8]

IDLE MODE LOAD BALANCING

PRIORITY

This application is a National Phase Entry of PCT International Application No. PCT/KR2016/004306, which was filed on Apr. 25, 2016, and claims a priority to British Patent Application No. 1513357.2, which was filed on Jul. 29, 2015, the contents of each of which are incorporated herein by reference.

BACKGROUND

1. Field of the Disclosure

The present invention relates to a method for balancing a load in a mobile communications network. Certain embodiments relate to balancing load across multiple cells and/or frequencies for mobile devices that are in an idle mode. In particular, certain embodiments of the present invention relate to methods for balancing an idle load using probability-based redistribution when there are multiple redistribution targets. Furthermore, certain embodiments of the present invention describe different triggers for which a re-distribution evaluation is performed.

2. Description of the Related Art

Wireless or mobile (cellular) communications networks in which a mobile terminal (UE, such as a mobile handset) communicates via a radio link to a network of base stations or other wireless access points connected to a telecommunications network, have undergone rapid development through a number of generations. The initial deployment of systems using analogue signalling has been superseded by Second Generation (2G) digital systems such as Global System for Mobile communications (GSM), which typically use a radio access technology known as GSM Enhanced Data rates for GSM Evolution Radio Access Network (GERAN), combined with an improved core network.

Second generation systems have themselves been largely replaced by or augmented by Third Generation (3G) digital systems such as the Universal Mobile Telecommunications System (UMTS), which uses a Universal Terrestrial Radio Access Network (UTRAN) radio access technology and a similar core network to GSM. UMTS is specified in standards produced by 3GPP. Third generation standards provide for a greater throughput of data than is provided by second generation systems. This trend is continued with the move towards Fourth Generation (4G) systems.

3GPP design, specify and standardise technologies for mobile wireless communications networks. Specifically, 3GPP produces a series of Technical Reports (TR) and Technical Specifications (TS) that define 3GPP technologies. The focus of 3GPP is currently the specification of standards beyond 3G, and in particular an Evolved Packet System (EPS) offering enhancements over 3G networks, including higher data rates. The set of specifications for the EPS comprises two work items: Systems Architecture Evolution (SAE, concerning the core network) and Long-Term Evolution (LTE concerning the air interface). LTE uses an improved radio access technology known as Evolved UTRAN (E-UTRAN), which offers potentially greater capacity and additional features compared with previous standards. SAE provides an improved core network technology referred to as the Evolved Packet Core (EPC). Despite LTE strictly referring only to the air interface, LTE is commonly used to refer to the whole of the EPS, including by 3GPP themselves. LTE is used in this sense in the remainder of this specification, including when referring to LTE enhancements, such as LTE Advanced. LTE is an evolution of UMTS and shares certain high level components and protocols with UMTS. LTE Advanced offers still higher data rates compared to LTE and is defined by 3GPP standards releases from 3GPP Release 10 onwards. LTE Advanced is considered to be a 4G mobile communication system by the International Telecommunication Union (ITU).

Particular embodiments of the present invention may be implemented within an LTE mobile network (though the present invention may be considered to be applicable to many types of wireless communication network). Therefore, an overview of an LTE network is shown in FIG. 1. The LTE system comprises three high level components: at least one UE 102, the E-UTRAN 104 and the EPC 106. The EPC 106 communicates with Packet Data Networks (PDNs) and servers 108 in the outside world. FIG. 1 shows the key component parts of the EPC 106. It will be appreciated that FIG. 1 is a simplification and a typical implementation of LTE will include further components. In FIG. 1 interfaces between different parts of the LTE system are shown. The double ended arrow indicates the air interface between the UE 102 and the E-UTRAN 104. For the remaining interfaces user data is represented by solid lines and signalling is represented by dashed lines.

The E-UTRAN 104 comprises a single type of component: an eNB (E-UTRAN Node B) which is responsible for handling radio communications between the UE 102 and the EPC 106 across the air interface. An eNB controls UEs 102 in one or more cell. LTE is a cellular system in which the eNBs provide coverage over one or more cells. Typically there is a plurality of eNBs within an LTE system. In general, a UE in LTE communicates with one eNB through one cell at a time.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding Serving Gateway (S-GW) 110 which routes data between the eNB and a PDN Gateway (P-GW) 112. The P-GW 112 is responsible for connecting a UE to one or more servers or PDNs 108 in the outside world. The Mobility Management Entity (MME) 114 controls the high-level operation of the UE 102 through signalling messages exchanged with the UE 102 through the E-UTRAN 104. Each UE is registered with a single MME. There is no direct signalling pathway between the MME 114 and the UE 102 (communication with the UE 102 being across the air interface via the E-UTRAN 104). Signalling messages between the MME 114 and the UE 102 comprise EPS Session Management (ESM) protocol messages controlling the flow of data from the UE to the outside world and EPS Mobility Management (EMM) protocol messages controlling the rerouting of signalling and data flows when the UE 102 moves between eNBs within the E-UTRAN. The MME 114 exchanges signalling traffic with the S-GW 110 to assist with routing data traffic. The MME 114 also communicates with a Home Subscriber Server (HSS) 116 which stores information about users registered with the network.

An increase in consumer demand for wireless broadband data is evident from the fast uptake of LTE across the world. As a result, there is a need to increase the capacity of wireless communications networks. A common solution to address this need is to deploy multiple carriers each having an associated cell, said deployment occurring particularly at locations where wireless network traffic is high. For example, to support growth, mobile operators may make more efficient use of the spectrum by offloading mobile data onto other carriers. These other carriers may be small cells (for example, femtocells, picocells, microcells etc.) which may allow for more efficient managing of the spectrum than that possible is macrocells were solely relied upon. In use, a small cell may be associated with a frequency and bandwidth which overlaps with that of a macrocell, thereby providing a situation in which multiple cells may be present in an area. However, it should be noted that the coverage area of a small cell is typically less that than of a macrocell. As a result, the small cell may only be detectable, by a UE, in certain locations within the whole coverage area of the macrocell.

To ensure efficient operation and optimal use of resources, the load among the multiple cells should be balanced. This balancing should take into account a number of different conditions and circumstances which may arise, for example, due to different capacities of cells and a number of cells available in a given area. In particular, in the case of a non-contiguous spectrum with multiple cells of difference bandwidths in different bands, the balancing needs to take into account that different areas may have different numbers of cells each having different capabilities.

Upon switching on, a UE runs a procedure for network and cell selection. A first part of this procedure involves selecting a public land mobile network (PLMN) that the UE will register with. Next, the UE may optionally ask a user to select a closed subscriber group (CSG) for registration. Finally, the UE selects a cell belonging to the selected network (and also to the selected CSG, if necessary). This cell selection by the UE is known as camping (that is, the UE camps on the selected cell). Prior to PLMN selection the UE may be in an RRC_IDLE state, while after cell selection the UE may contact an eNB of the selected cell and initiate an RRC connection establishment procedure which, if successful, moves the UE to the RRC_CONNECTED state. When in the RRC_IDLE state the UE may camp on a cell to: receive system information for the camped cell; perform the RRC connection procedure described above; and receive paging messages and Public Warning System (PWS) notifications.

A UE is in RRC_IDLE state (idle mode/state) when it is in a standby state. Here, the signalling radio bearer (SRB1) used for RRC (Radio Resource Control) messages is torn down and no serving eNB is assigned for the UE. In this state, limited communication is possible. For example, a radio access network (RAN) may contact the UE using an RRC Paging message. If the UE needs to contact the RAN or send a response to a received Paging message, the UE may initiate an RRC connection establishment procedure resulting in an eNB moving the UE to RRC_CONNECTION state (connected mode/state. In connected mode, the UE is assigned to the eNB and can communicate with the eNB on SRB1 using signalling messages. It has been observed that a strong correlation exists between the idle mode UE density and the connected mode UE traffic load in a EUTRAN cell. From this, it follows that controlling the distribution of the idle mode UEs throughout the multiple cells may be useful in achieving load balancing for the multiple cells.

UE mobility is handled differently depending on whether the device is in the RRC_IDLE or RRC_CONNECTED state. For instance, in idle mode, it is the UE which decides which cell to camp on, without informing an eNB about mobility (unless there is a change in Tracking Area, TA). However, the eNB can influence reselection through configuration parameters. Hence, the eNB may move the UE to idle mode to reduce mobility related signalling. As such, the UE, using a process called cell reselection, determines a cell to which it will listen. In contrast, in the connected mode it is important for the RAN to control which cell the UE is communicating with. This is due to the fact that the UE, in this state, may be transmitting and receiving at a high data rate. The RAN achieves this goal by using a procedure known as handover, where the RAN switches the communication path of the UE from one cell to another. If the new cell and the old cell are controlled by different base stations then the RAN reroutes the UEs S1-U interface (the component of the S1 interface (the means by which the eNB is connected to the EPC) which carries traffic for the serving gateway) and the S1-MME interface (the component of the S1 interface which carries signalling messages for the mobility management entity).

There exist various methods by which the eNB can control cell reselection (that may be used for load balancing), for example, adjusting a reselection measurement threshold, broadcast or dedicated priorities.

To provide further detail, Broadcasted absolute Priorities (BP) is a method whereby, during idle mode, the network can influence which LTE frequency layer a UE will camp on. This is achieved by setting the values of broadcasted absolute cell reselection priorities 0 from 0 to 7 (where 7 is the highest priority). When the highest priority access is not available at the location of the UE, inter-frequency measurements are periodically performed. These priorities are part of system information and so apply to all users.

Additionally, in a Dedicated Priorities (DP) method, absolute priorities used in RRC_IDLE state may also be included in RRC_CONNECTED state release messages. These values are allowed to differ for each user, and so the priorities are known as Dedicated Priorities (DP). At the same time as the state transition, DPs allow UEs to be directed to the best candidate layer (according to the operator-specific traffic steering policy), thereby overruling broadcasted information.

However, these load balancing methods are not ideal when it comes to performing idle load balancing. In fact, deficiencies with these known mechanisms has resulted, in some cases, on a reliance on redirection or handover after the UE has changed to an active mode (for example, where a call has been established) to achieve load balancing. Consequently, there is an increase in signalling load. Furthermore, any load balancing achieved by the redirection and handover techniques is only temporary because eventually the UE will revert to idle mode reselection rules, and so, for instance, re-select its initial cell to camp on.

A known idle mode load balancing method is for a network to indicate, to a UE, a percentage or proportion of UEs which should camp on a specific frequency or cell. For instance, referring to FIG. 2, a first cell 1010 corresponding to frequency $f_1$ and a second cell 1020 corresponding to frequency $f_2$ may each initially have a number of UEs camped on them, in this case an equal number of UEs such that the load is split 50:50. The network may then indicate, to each UE, that the load should instead be split differently, in this case 75:25 with the majority on frequency $f_1$ and so the first cell 1010.

To achieve this, the eNB indicates the intended percentage of UEs for each frequency. In the context of FIG. 2, it is indicated that 75% of UEs should be camped on frequency $f_1$ (and so the first cell 1010) and 25% of UEs should be camped on frequency $f_2$ (and so the second cell 1020). Then, regardless of which frequency a UE is currently camping on, the UE generates a random number, for example in the range 0 to 1, and compares this to the intended percentage indications from the eNB. For example, if a UE generates a random number below 0.75 then it chooses the first cell 1010 on frequency $f_1$ and otherwise selects the second cell 1020 on frequency $f_2$. However, this type of method will result in UEs unnecessarily moving from frequency $f_1$ to frequency $f_2$, which is undesirable and may waste network and UE resources. That is, as shown in FIG. 2, UEs in group 1025 which were previously camped on the first cell 1010 may move to the second cell 1020 and more UEs than necessary—indicated by the group 1015—may move to the first cell 1010 from the second cell 1020 than necessary. This is in contrast to a more ideal situation in which all UEs on the first cell 1010 could remain on the first cell 1010 and the network required load distribution could be achieved simply by the movement of UEs initially camped on the second cell 1020.

Another method is described in US-2014/0213277-A1 which describes a system and method to perform load-balancing and congestion control between a primary radio access technology (RAT) and a secondary RAT. In this document it is assumed that a UE is initially camped on the secondary RAT. If the primary RAT is congested, an indicator may be used in a message broadcast by a base station of the secondary RAT which prevents UEs in an idle mode from switching to or selecting the primary RAT. This document further describes use of a probability value (potentially specific to a particular group of UEs) in determining whether a UE may switch to or re-select the primary RAT. Furthermore, this document describes a retention timer which prevents future primary RAT re-selection attempts while the retention timer is running.

Additionally, this document indicates a known solution to address an inter-RAT load imbalance issue resulting from UEs selecting to camp on their primary RAT whenever possible. This solution involves grouping UEs together, assigning a group number to each UE, and then only allowing UEs corresponding to certain groups to reselect the primary RAT when in an idle state. It is further disclosed that this solution may also be applied to the case of a primary RAT having a multi-carrier configuration; where carrier-specific probability values are used. Here, a UE in an allowed/enabled group may select a carrier based on a carrier-specific probability value and also based on any priority value assigned to that carrier There is therefore a need to develop a more efficient method for idle load balancing of UEs to aid in multi carrier load balancing.

SUMMARY

According to a first aspect of the present invention, a method for performing an idle mode redistribution evaluation by a mobile device in a mobile communication network is provided.

The method comprises: determining a plurality of redistribution targets, each redistribution target corresponding to a different frequency and comprising at least one cell within which the mobile device can camp on in idle mode in the wireless communication network; identifying, using information received from within a particular cell of the wireless communication network, at least one redistribution factor, each redistribution factor corresponding to a redistribution target; determining whether to move to one of the redistribution targets based on the at least one redistribution factor; wherein a redistribution factor for a redistribution target indicates a proportion of mobile devices currently distributed to the particular cell which are intended to camp on a cell corresponding to that redistribution target; and wherein identifying at least one redistribution factor comprises determining, for each redistribution target, whether a redistribution factor is specified for a first cell corresponding to that redistribution target, and if so setting the redistribution factor for the first cell as the only redistribution factor associated with that redistribution target.

In certain embodiments, the method further comprises: measuring, on the frequency corresponding to each redistribution target, radio link properties for each cell corresponding to frequency and ranking the cells based on the measurement results; wherein the redistribution factor for the first cell is set as the only redistribution factor associated with that redistribution target only if the first cell satisfies a condition based on the ranking of cells of the frequency corresponding to that redistribution target.

Furthermore, in yet other embodiments, the condition is that the first cell is the highest ranked of the cells on the frequency corresponding to that redistribution target.

In certain embodiments, identifying at least one redistribution factor further comprises: if, for the frequency corresponding to a redistribution target, a redistribution factor specified for the first cell is not set as the redistribution factor associated with that redistribution target, setting a redistribution factor specified for the frequency corresponding to that redistribution target as the only redistribution factor associated with that redistribution target.

In certain embodiments, determining whether to move to one of the redistribution targets comprises one of: determining whether to move to a frequency corresponding to the one of the redistribution targets; determining whether to move to a specific cell on the frequency corresponding to the one of the redistribution targets; or determining whether to move to a specific cell of a set of cells on the frequency corresponding to the one of the redistribution targets.

Furthermore, in yet other embodiments, for each redistribution target the corresponding at least one redistribution factor is one of: a redistribution factor for a frequency corresponding to the redistribution target, a redistribution factor for a specific cell on the frequency corresponding to the redistribution target; or a redistribution factor for a set of cells on the frequency corresponding to the redistribution target.

In certain embodiments, determining a plurality of redistribution targets comprises: identifying, using the information received from within the particular cell, a plurality of potential targets, each potential target corresponding to a frequency supported by the mobile device; and determining a subset of the potential targets as the plurality of redistribution targets by performing measurements on at least one cell of each potential target to determine whether predetermined radio conditions are satisfied.

Furthermore, in yet other embodiments, each potential target of the subset of potential targets corresponds to a different frequency.

Furthermore, in yet other embodiments, each potential target is one of a frequency supported by the mobile device or a cell on a frequency supported by the mobile device.

In certain embodiments, determining a plurality of redistribution targets comprises: determining if the information from the particular cell is received; and, if so, performing the determining of a plurality of redistribution targets.

Furthermore, in yet other embodiments, determining a plurality of redistribution targets further comprises: determining if the information from the particular cell indicates a change in at least one known redistribution factor; and, if so, performing the determining of a plurality of redistribution targets.

In certain embodiments, determining a plurality of redistribution targets comprises: determining expiration of a timer configured by the mobile device; and if the timer is determined to expire, performing the determining of a plurality of redistribution targets; wherein the timer is configured to expire when a trigger event occurs; and wherein the timer is associated with a previous idle mode redistribution evaluation and is set for a predefined period of time.

Furthermore, in yet other embodiments, the trigger is: a network initiate request for performing the idle mode redistribution evaluation, the mobile device leaving a previous redistribution target corresponding to the previous idle mode redistribution evaluation, or the predefined period of time elapsing.

Furthermore, in yet other embodiments, the method comprises, while the timer is running, ignoring receipt of further information suitable for identifying at least one known redistribution factor.

Furthermore, in yet other embodiments, the method comprises, when the timer is determined to expire, performing the determining of a plurality of redistribution targets, when it is determined that the information from within a particular cell of the wireless network is received.

Furthermore, in yet other embodiments, the timer is configured when performing the previous idle mode redistribution evaluation; and wherein the predefined period of time is configured according to one of: a value indicated by a cell the mobile device is currently camped on or a cell the mobile device was camped on during the previous idle mode redistribution evaluation; or a value indicated by the cell the mobile device is currently camped on and was moved to as a result of the previous idle mode redistribution evaluation, wherein, upon conclusion of the previous idle mode redistribution evaluation, the end-time of the timer was updated based on the value.

In certain embodiments, when it is determined to perform the determination of a plurality of redistribution targets, starting a new timer configured according to the current idle mode redistribution evaluation.

In certain embodiments, determining a plurality of redistribution targets comprises: determining if a network initiated request is received; and if the network initiated request is received, performing the determining of a plurality of redistribution targets.

Furthermore, in yet other embodiments, the network initiated request includes information relating to dispersion in the time domain.

In certain embodiments, the method further comprises: determining if the mobile device leaves the area of a currently camped on cell and if the mobile device leaves the area, either: performing the determining of a plurality of redistribution targets; or moving to a previously camped on cell.

In certain embodiments, determining whether to move to one of the redistribution targets comprises determining to move to a selected one of the redistribution targets; and prioritizing the frequency corresponding to the selected redistribution target to be either: the highest priority within a current priority level; the highest overall priority; or the highest priority within a configured priority level.

In certain embodiments, determining whether to move to one of the redistribution targets comprises determining to move to a selected one of the redistribution targets only a measured radio link quality meets a quality threshold.

In certain embodiments, the method further comprises: determining to move to one of the redistribution targets; camping on a cell included in the redistribution target; and if the radio link quality for the camped on cell falls below a threshold for starting intra frequency measurements, starting inter frequency measurements.

In certain embodiments, the method further comprises: identifying, using the information received from within the particular cell, a plurality of potential targets, each potential target corresponding to a different frequency supported by the mobile device; determining if radio measurements have been performed for each potential target; and for any potential targets for which no radio measurements have been performed, at least one of: performing a one-shot measurement for these potential targets; and performing measurements with reduced measurement performance for these potential targets.

In certain embodiments, determining whether to move to one of the redistribution targets comprises: generating a pseudo-random number within a range; generating a plurality of sub-ranges within the range, wherein a sub-range is generated for each redistribution target based on the corresponding at least one redistribution factor; and determining to move to the redistribution target corresponding to the sub-range to which the pseudo-random number corresponds.

In certain embodiments, determining of whether to move to one of the redistribution targets is based on all identified redistribution factors.

In certain embodiments, the particular cell of the wireless network is the currently camped-on cell.

In certain embodiments, the wireless network is a Long-Term Evolution, LTE network.

According to a second aspect of the present invention, a mobile device in a mobile communication network is provided. The mobile device is arranged to perform any of the methods listed above.

Also disclosed is a base station in a mobile communication network. The base station is arranged to broadcast information indicating at least one redistribution factor for a redistribution target corresponding to a frequency; wherein a redistribution factor for a redistribution target indicates a proportion of mobile devices currently distributed to a cell corresponding to the base station which are intended to camp on the redistribution target.

Also disclosed is a method for performing an idle mode redistribution evaluation by a mobile device in a communication network. The method comprises: identifying, at least one potential redistribution target frequency, each potential redistribution target frequency corresponding to a frequency supported by the mobile device for which broadcast information received from within a particular cell of the wireless communication network includes redistribution information; measuring radio conditions for each potential redistribution target frequency; determining, for each potential redistribution target frequency, a reselection candidate cell, a reselection candidate cell being the cell on that potential redistribution target frequency which the UE would reselect to based on existing reselection procedures in case the UE would redistribute to the that potential redistribution target frequency; determining at least one redistribution target by: if, for a potential redistribution target frequency. there is a reselection candidate cell, determining if the broadcast information indicates a redistribution factor for that reselection candidate cell and, if so, identifying that reselection candidate cell as a redistribution target and setting a redistribution factor associated with that reselection candidate cell for that redistribution target; otherwise, determining if the broadcast information indicates a redistribution factor for that potential redistribution target frequency and, if so, identifying that potential redistribution target frequency as a redistribution target and setting a redistribution factor associated with that potential redistribution target frequency for that redistribution target; and determining whether to move to one of the redistribution targets based on at least one redistribution factor; wherein a redistribution factor for a redistribution target indicates a proportion of mobile devices currently distributed to the particular cell which are intended to camp on the redistribution target.

Also disclosed is a method for performing an idle mode redistribution evaluation by a mobile device in a communication network. The method comprises: identifying, using broadcast information received from within a particular cell of the wireless communication network, at least one potential target, each potential target corresponding to a frequency supported by the mobile device and comprising a cell within which the mobile device can camp on in idle mode in the wireless communication network; measuring radio conditions for each potential target; ranking, for each frequency, each potential target corresponding to that frequency based on the results of the measurements; determining, for each frequency, whether there is a potential target which satisfies a condition based on the ranking of potential targets on that frequency; determining at least one redistribution target by: if, for a frequency, there is a potential target which satisfies the condition, determining if the broadcast information indicates a redistribution factor for this potential target and, if so, identifying that potential target as a redistribution target and setting a redistribution factor associated with that potential target for that redistribution target; otherwise, determining if the broadcast information indicates a redistribution factor for that frequency and, if so, identifying that frequency as a redistribution target and setting a redistribution factor associated with that frequency for that redistribution target; determining whether to move to one of the redistribution targets based on at least one redistribution factor; wherein a redistribution factor for a redistribution target indicates a proportion of mobile devices currently distributed to the particular cell which are intended to camp on the redistribution target.

Also disclosed is a base station in a mobile communication network. The base station is arranged to broadcast information indicating at least one potential target corresponding to a frequency supported by a mobile device, and a redistribution factor for at least one potential target; wherein a redistribution factor for a potential target indicates a proportion of mobile devices currently distributed to a cell corresponding to the base station which are intended, if these mobile devices determine the potential target to be a redistribution target, to camp on that redistribution target.

Another aspect of the present invention provides a computer program comprising instructions arranged, when executed, to implement a method and/or apparatus in accordance with any one of the above-described aspects. A further aspect provides machine-readable storage storing such a program.

BRIEF DESCRIPTION OF THE DRAWINGS

Embodiments of the invention are further described hereinafter with reference to the accompanying drawings, in which:

FIG. 1 schematically illustrates an overview of an LTE mobile communication network;

FIG. 2 illustrates load balancing according to a known method;

FIG. 3 illustrates an exemplary network environment;

FIG. 4 illustrates a method of performing a redistribution evaluation in accordance with an embodiment of the present invention;

FIG. 5 illustrates load balancing according to an embodiment of the present invention;

FIG. 6 illustrates a method of performing a redistribution evaluation in accordance with another embodiment of the present invention;

FIG. 7 illustrates a method of triggering a redistribution evaluation in accordance with another embodiment of the present invention; and FIG. 8 illustrates a two state system representing a status of a combined timer.

DETAILED DESCRIPTION

Embodiments of the present invention will now be described in the context of an LTE compliant mobile wireless communications network operating in accordance with the 3GPP LTE standards up to Release-12 and beyond—in particular with a view to Release-13. However, it will be understood that this is by way of example only and that other embodiments may involve other wireless networks, operating at least partially in compliance with other releases and standards.

According to certain embodiments of the present invention a wireless telecommunication network may include a mobile device (for example, user equipment, UE) and a plurality of cells (each cell, for example, corresponding to an E-UTRAN Node B or eNB). Each cell may correspond to a certain frequency and bandwidth (or, alternatively, frequency range). Furthermore, a plurality of cells may share at least part of a frequency range, for example due to overlapping bandwidths. Such a circumstance may arise, for example, when a small cell (for example, a femtocell, a picocell, a microcell etc.) overlaps with a macrocell. Additionally, two cells may correspond to different frequencies or frequency ranges which do not overlap. As a result, a mobile device may be associated (that is, may camp on, select, be distributed to etc.) a cell of a specific frequency or a specific cell of a specific frequency.

In a wireless telecommunication network such as that described above, a mobile device may be prompted to perform an evaluation (also referred to a re-evaluating) as to whether or not the mobile device should redistribute (that is, should move to a different frequency) as part of an idle mode load balancing method. The mobile device, in this circumstance, is assumed to be in an idle mode (RRC_IDLE state). As shall be discussed later, the prompting may arise through a variety of triggers both internal and external to the mobile device. Upon the evaluation being triggered, the mobile device may detect a plurality of frequencies or cells on which the mobile device may camp. That is, the mobile device may detect the cells which are available at the current location of the mobile device (where the current location is within the coverage area of the detected cells), and may make a determination as to which of the detected cells are suitable to camp on. A main aspect of suitability is that the radio link quality has to be sufficiently good. More precisely, the radio link quality must meet a suitability criterion (S-criterion); an eNB of a cell broadcasts parameters related to this. Furthermore, a cell may be unsuitable because it e.g.

does not provide access for the mobile devices selected PLMN, or concerns an inaccessible CSG cell. As will be described below, in certain embodiments of the present invention the mobile device may, in performing the evaluation, use information broadcast from within a serving cell to detect the frequencies on which the mobile device can redistribute to.

When a mobile device selects a new PLMN, it initially performs a cell selection to quickly identify a cell on which it can camp. However, this cell may not be the best cell and so the mobile device may reselect a cell to camp on. This reselection may take into account absolute priorities of different E-UTRAN frequencies or inter-RAT frequencies which may be provided to the mobile device in the system information, in an RRCConnectionRelease message, etc. These absolute priorities may influence the reselection process.

In view of this, and with regards to the following discussion of the present invention, it should be understood that there may be other factors which dictate which frequency a mobile device is redistributed to. That is, a mobile device may obey some cell reselection policy which may be indicated by the network. For example, different frequencies may be assigned dedicated priorities such that a mobile device is forced or induced to select accordingly. According to certain embodiments, the methods and mechanisms for idle mode redistribution which will be described below should co-operate with (or, at least, not oppose) such established policies, or take into account any priorities such as may be broadcast by the network and intended for use during reselection.

With regards to the following detailed description, the skilled person will understand how absolute broadcast priorities (BP) and absolute dedicated priorities (DP) may relate to the use of priorities (and prioritization) described in relation to certain embodiments of the present invention. That is, the skilled person will appreciate how the described use of prioritization in redistributing a mobile device to another frequency may relate to the use of BP and DP in cell reselection.

The above applies both in the case of a mobile device camped on an initial frequency being frequency steered and also being steered in a cell-specific manner. That is, for frequency steering the mobile device is steered to any cell corresponding to a target frequency different to the frequency on which it is currently camped; while for cell-specific steering the mobile device is steered to a specific cell corresponding to a frequency different to that which it is currently camped on instead of another cell corresponding to this same frequency. Cell-specific steering may be used in the case where a highly-loaded cell and an unloaded cell exist on the same frequency (different to a frequency a mobile device is currently camped on). Here, frequency steering may allow an operator to steer devices away from this frequency to prevent the highly-loaded cell becoming even more so, however cell-specific steering may be used to steer some devices to the unloaded cell. This type of setup may be useful if the unloaded cell if a small cell and so has a smaller coverage than the highly-loaded cell. That is, cell-specific steering may only be used for devices within the coverage of the unloaded small cell, while frequency steering may be used otherwise to prevent further burdening of the highly-loaded cell.

Typically, a mobile device determines a cell on a frequency to camp on according to cell reselection policies such as described throughout this description. In view of this, idle mode load rebalancing according to certain embodiments of the present invention can be thought of the mobile device choosing between frequencies on which to camp; with the (re-)selection of a cell associated with a chosen frequency potentially involving said cell reselection policies and also considerations such as radio signal properties for the cells, amongst other factors.

Referring now to FIG. 3, which illustrates a wireless network environment comprising at least one mobile device and a plurality of cells across a plurality of frequencies, a mobile device 215 may initially be camped on a first cell 210. Additionally, the environment also comprises a second cell 220, a third cell 230 and a fourth cell 240, some or all of which are detectable by the mobile device 215. It will be appreciated that other mobile devices may be present in the environment, where each other device may be camped on one of the first to fourth cells. For example, another mobile device 225 is shown in associated with the second cell 220. Furthermore, it will be appreciated that a lesser or greater number of cells may be in the environment or detectable by a mobile device. Additionally, it will be appreciated that mobile devices in such an environment may have difference device capabilities, for example supporting different frequencies.

For the purposes of illustrating the present invention, examples will be described below which demonstrate the differences which may result from one mobile device 215 being initially camped on a different frequency to another mobile device; and where four cells 210-240 are present and correspond to three different frequencies $f_1$, $f_2$, $f_3$ (or frequency ranges) with the third cell 230 also being considered a small cell sharing the same frequency ($f_2$) as the second cell 220 and having a coverage area overlapping with (but smaller than) the second cell 220. Note that the arrangement of cells and mobile terminals in FIG. 3 is not intended to indicate a geographical coverage for each cell or frequency, for example such that it could be interpreted that mobile device 215 is out of the coverage of the second through fourth cells 210-240. Additionally, note that the present invention is not in any way limited to the above-described network configuration.

At a given time (potentially resulting from some trigger, as will be described later), mobile device 215 may perform an evaluation (or a "re-evaluation") as to whether or not it needs to move to a new frequency on which to camp. This evaluation may be part of a load balancing mechanism. If only a single frequency (potentially corresponding to multiple cells comprising a best cell) is determined (a single redistribution target), then it may be a simple matter for the mobile device 215 to choose this detected target frequency, and then remain on or move to (any cell or the best cell on) this chosen frequency. That is, the determined frequency may be $f_1$ (corresponding to the first cell 210) which the mobile device 215 is already camped on (and so the result of the evaluation is to stay on the first cell 210), or a new frequency (one of frequency $f_2$ or $f_3$) the coverage of which the mobile device 215 has moved in to while leaving the coverage of frequency $f_1$ (and so the result of the evaluation is to move to a cell in the chosen frequency). Upon choosing a new frequency to move to, the mobile device 215 may take into account pre-existing cell reselection policies when determining a cell of the chosen frequency on which to camp. For example, the network may indicate control parameters, including frequency parameters (for example, priorities, offsets etc.) and cell specific parameters (for example, offsets etc.), to the mobile device 215. The mobile device 215 may then use these parameters when evaluating different reselection candidates.

However, it may be the case that multiple redistribution targets (that is, multiple target frequencies each comprising one or more cells, exemplified here by the first to third frequencies $f_1$ to $f_3$ comprising cells 210-240 in all) are detected by the mobile device 215. In this event, the mobile device 215 may need to determine which frequency to choose during the load balancing procedure (which may result in determining to remain camped on a current frequency or moving to another frequency). For example, this exemplary network environment could be said to comprise three redistribution targets corresponding to frequencies $f_1$, $f_2$ and $f_3$, where the redistribution target corresponding to $f_2$ comprises two cells. However, it could also be said that the network environment comprises three redistribution targets corresponding to frequencies $f_1$ and $f_3$, and the specific cell on frequency $f_2$ of the third cell 230. The skilled person will appreciate the different manners in which redistribution targets may be considered, particular in view of the following description.

However, it will also be appreciated that a redistribution target may be defined in alternative manners. For instance, a redistribution target may concern a single cell or multiple cells on another frequency, where the latter corresponds to a case where a mobile device may be redistributed to any cell on the other frequency. Furthermore, embodiments exist whereby there is only a single target on a frequency due to the mobile device being intended to always camp on the best (highest ranked) cell of the frequency. In this respect, the determination of redistribution targets may take several further steps into account, such as determining if a specific cell potential target is the best cell on a corresponding frequency from the point of view of the mobile device and, if so, taking this specific cell potential target to be the redistribution target for that frequency.

In certain embodiments, this determination should take into account the capacity of each of the first to fourth cells 210-240 and the load of each of the first to fourth cells 210-240 such that a load is balanced across all of the cells. That is, assuming the situation (described above) in which the mobile device 215 is not the sole mobile device within in the coverage area of at least one of the detected frequencies, a plurality of mobile devices are present and each mobile device may be camped on a cell in one of the frequencies. If one of the cells is highly-loaded (has many mobile devices camped on it), then the evaluation may indicate that devices should not move to the frequency corresponding to the highly-loaded cell. Unless, that is, if the devices are in coverage of another cell on the same frequency which is sufficiently lightly-loaded (refer to cell-specific steering and the example given above regarding the macro cell (second cell 220) and small cell (230) corresponding to frequency $f_2$), then the evaluation may indicate that devices should move to the lightly-loaded cell corresponding to the frequency.

As indicated above, a known method for determining a cell to choose simply indicates a proportion or percentage of devices which should be camped on each frequency of the multitude of frequencies. However this method has drawbacks, such as motivating mobile devices to unnecessarily move to other frequencies.

FIG. 4 is shows a method according to an exemplary embodiment of the present invention. A mobile device 215 determines a plurality of redistribution targets in step 310. For example, upon being prompted (as a result of some trigger, for instance) to perform an evaluation as to whether the mobile device 215 should move cell (for example, as part of a load balancing procedure), the mobile device 215 detects the three (target) frequencies $f_1$ to $f_3$ (and first through fourth cells 210-240) which are suitable to camp on (where subsequent choosing of a cell corresponding to the chosen frequency may take place according to conventional methods). As will be described later, in certain embodiments this determination may involve information broadcast from within a currently camped-on cell, and also may involve additional measurements. In certain embodiments, for load distribution, the mobile device 215 chooses between a number of candidate cells each on a different frequency, where all of these candidate cells must meet certain minimum criteria.

For example, according to certain embodiments of the present invention, the mobile device 215 may detect a broadcast from within a currently camped cell. The broadcast may indicate redistribution factors associated with a number of potential targets, where the redistribution factors will be described in further detail later. Upon receiving this information, the mobile device 215 may use the indicated (or identified) potential targets to determine a subset of redistribution targets. These redistribution targets are those that the mobile device 215 may actually select (choose between) in the balancing procedure. That is, it will be appreciated that, due to device capabilities, some of the potential targets may be unsuitable for the mobile device 215 to consider; for example, due to a potential target corresponding to an unsupported frequency. In this case, it has been assumed that the mobile device 215 supports the three frequencies $f_1$, $f_2$ and $f_3$, but it will be appreciate that this may not always be the case.

In addition to device capabilities, the redistribution targets may also be limited to those potential targets for which measurement results satisfy certain criteria. For instance, in case the mobile device 215 is not performing measurements of some potential targets (e.g. when the quality of the serving cell is high the mobile device 215 may refrain from measuring neighbour cells on the serving or other frequencies), it may perform such measurements specifically for the purpose of load distribution. Care should be taken that this does not consume too much mobile device 215 battery e.g. by only performing such measurements when evaluating redistribution targets (which should be infrequent). For example, one such criteria is that the radio link quality must be sufficiently good (that is, above the S-criterion). These measurement results may therefore indicate a best cell, from a radio perspective, on a given frequency. Upon determining the redistribution targets in this manner, the method may proceed to step 320. In certain embodiments, only a single potential target for each frequency may be determined as the redistribution target for that frequency, where, for example, this potential target may be a specific cell which is measured to be the best cell (highest ranked) and also has a redistribution factor indicated by the broadcast, or may be the frequency in general where the broadcast indicates a redistribution factor to be used for this frequency.

In step 320, the mobile device 215 identifies, for each of the determined frequencies, a redistribution factor. It will be appreciated how the redistribution factor which is identified for a given frequency may be thought to relate to the cell(s) corresponding to that frequency. That is, a redistribution factor may prompt a mobile device to move to a frequency where it is then expected that the mobile device 215 will reselect the best cell corresponding to that frequency. Alternatively, a redistribution factor for a frequency may be configured to prompt the mobile device 215 to move to a specific cell on the frequency, precluding cell reselection by the mobile device 215. This may ensure, for example, that the mobile device 215 does not choose another cell corresponding to that frequency (where this other cell may be heavily-loaded, or where the specific cell is just more unloaded as so a more optimal target). It will be appreciated that if the mobile device 215 is outside the area where the specific cell is best (or highest ranked among cells on that frequency) then, for the frequency corresponding to the specific cell, the mobile device 215 will apply the frequency specific redistribution factor associated with that frequency. As a result, a mobile device 215 inside the area where the specific cell is best may conclude the evaluation with a different result to a mobile device 215 outside the area where the specific cell is best. Additionally, in certain embodiments no redistribution factor may be provided for a specific frequency, thereby indicating that there should be no redistribution to that frequency (as will be described later, this may also be achieved by appropriate choice of redistribution factor, for example a value of zero).

In the example provided above, note that the specific cell redistribution factor is considered, by the mobile device 215, when the mobile device is within the area where the specific cell is best. That is, in certain embodiments, for the purpose of using the cell specific redistribution factor, it is not sufficient that the mobile device is simply within coverage of the specific cell. For example, although the mobile device 215 may be within coverage of the specific cell, a radio link with the specific cell may be poor. Therefore even though the specific cell may be lightly loaded, it would not be optimal for the mobile device 215 to consider the specific cell as a redistribution target. In this circumstance, the mobile device may instead apply the redistribution factor associated with the frequency of the specific cell, essentially considering the redistribution target as the frequency instead of a specific cell on the frequency. In the following, it should therefore be considered that, when the mobile device 215 is described as using a cell specific redistribution factor (due to being said to be within coverage of the specific cell), circumstances may be such that the specific cell is also the best cell from the point of view of the mobile device 215. That is, it will be appreciated that if the mobile device 215 is described as considering a cell specific redistribution factor then the mobile device 215 is in a location where the specific cell is best from a radio perspective i.e. highest ranked cell on the concerned frequency. To apply cell specific parameters radio criteria other than best cell may be defined, e.g. target cell's strength or quality meet a certain threshold.

In certain embodiments of the present invention, the redistribution factor for each of the frequencies or cells is identified according to, or using, information associated with a specific one of the cells. As will be discussed later, in certain embodiments this information may be broadcast from within the specific cell (for example from the eNB of the specific cell). The receipt of this information may be the prompt for the mobile device 215 to perform the (re-)evaluation. However, as will be discussed later, embodiments exist where such a prompt is ignored by the mobile device 215. For example, the specific cell may be the first cell 210, upon which the mobile device 215 is currently camped. Alternatively, according to another embodiment, this information may have been previously received by the mobile device 215, stored in a storage unit of the mobile device 215, and then used when the prompt for performing the evaluation is received (where in this case the prompt may be other than a broadcast from within a cell). As with the above alternative, this previously received information may have originated from the first cell 210, upon which the mobile device 215 is currently camped.

According to certain embodiments, the redistribution factor may be considered as an example of information which indicates that a redistribution target should be moved to. For instance, this information may be an indication of an amount of mobile devices that should move to a particular frequency (that is, move to a particular redistribution target, be it a particular frequency or a specific cell on a particular frequency) of the—frequencies $f_1$ to $f_3$. Such an indication may allow the mobile device 215 to make a probabilistic determination as to which frequency to move to, and so may be generated according to an 'ideal' (idle) load determined for each cell. It will further be appreciated that the information may be provided for a defined set of cells (for example, a range of physical cell identifies, PCIs etc.). As such the same redistribution factors may be signalled for multiple cells without the need to provide individual information (redistribution factors) for each cell.

Here, an 'ideal' load is a load which has been determined by the network in some manner. For instance, it may be set by a service operator, potentially taking into account different times of day (to account for peak usage times) or known events (such as sporting events); it may be determined by a base station controlling a cell according to current conditions within a cell (for example, based on some algorithm) and potentially conditions in neighboring cells; however it should not be considered as limited to these two examples, as would be understood by the skilled person. An eNB may determine idle mode population based on the number of connection establishments. Furthermore, it will be appreciated that certain frequencies can support more load that others (due to differences in bandwidth, for example), and also that some carriers may be preferentially selected by specific mobile devices e.g. based on subscription or capabilities. It will be appreciated that the specifics of the above may result from eNB implementation.

In step 330 the mobile device 215 determines whether to redistribute to one of the frequencies (and so one of the first to fourth cells 210-240) using the identified redistribution factors, or suitable information indicating a frequency that should be moved to. In this respect, according to certain embodiments of the present invention, determining whether to redistribute may involve using at least one of the redistribution factors in a probabilistic determination. These redistribution factors may be used to generate selection conditions for one or more of the redistribution targets.

According to certain embodiments of the present invention, this probabilistic determination may involve the use of one or more redistribution factors in conjunction with some random element—such as a numeral value—generated by the mobile device 215 (where the skilled person will appreciate how the generation of such an element by a logic computing machine may be said to be "random" or "pseudorandom"). The probabilistic nature of the determination is therefore reflected in the random nature of this generated element. That is, while the redistribution factors are the same for every device in the same specific cell (assuming that the capabilities of every device are the same; for example, every device determines the same subset of potential targets as redistribution targets), each device should generate a different random element.

As a result, the redistribution factors may be used, for example, to define one or more conditions which can be applied to each random number in order to determine which frequency each mobile device performing the evaluation should select. That is, each random number may be compared to the one or more conditions to determine a resulting distribution target. For instance, in the case of the random element being a numerical value generated within a specific range, the redistribution factors may be used to generate different sub-ranges within the specific range. Here, the conditions correspond to a number falling within one of these sub-ranges. The sub-range in which a generated random number falls indicates the frequency to which the corresponding mobile device should move. A more detailed example of this will be described below with reference to FIG. 5.

Upon determining a redistribution target to choose (not shown in FIG. 4), the mobile device 215 may move to the chosen redistribution target (and so implicitly choosing the determined target). It will be appreciated by the skilled person that there may be many ways to achieve or facilitate this movement.

For example, according to certain embodiments the mobile device 215 may simply prioritize the chosen redistribution target, whether it is a specific cell corresponding to a chosen frequency or a specific frequency. The prioritization of redistribution targets will be described further below, for now it is noted that this may be implemented by considering the chosen redistribution target to have the highest priority within a reference priority level, where the reference priority level may be, for example, a priority level of the original frequency upon which the mobile device 215 is camped, a priority level configured by the network or the highest priority overall. For instance, in the case of frequency steering, the result of the evaluation is that the mobile device 215 prioritises the chosen frequency within coverage of any cell corresponding to the chosen frequency. Whereas, for the case of cell-specific steering, this prioritization of the chosen frequency only applies when the mobile device is within coverage of the specific cell for which the cell-specific steering is configured, and so not for any other cells corresponding to the chosen frequency. It is stressed that the use of prioritization is but one method by which the mobile device may move to the frequency indicated by the idle mode balancing evaluation, and so the present invention is not limited to such.

As mentioned above, the redistribution factors may be identified according to information associated with a specific cell, such as a cell that a mobile device is currently camped on. As a result, a mobile device 215 in the first cell 210 (so camped on frequency $f_1$) may identify different redistribution factors from another mobile device 225 in the second cell 220 (so camped on frequency $f_2$). Alternatively, the other mobile device 225 may not receive any information suitable for identifying redistribution factors (and so may not actually be prompted to perform the evaluation). This cell-based control may further enhance the load balancing method by ensuring that only devices on a particular cell are provided with an opportunity to move or redistribute.

For example, FIG. 5 shows an initial configuration similar to FIG. 2 in which a network environment comprises a first cell 2010 corresponding to frequency $f_1$ and a second cell 2020 corresponding to frequency $f_2$, and a number of mobile devices split evenly between the cells. It may become desirable to redistribute the mobile devices such that 75% of the devices are moved to frequency $f_1$ (camped on the first cell 2010) while 25% are moved to frequency $f_2$ (camped on the second cell 2020). To achieve this, while also avoiding the situation shown in FIG. 2, the eNB (or base station) of the first cell 2010 may not broadcast to the cells already camped on it, while the eNB of the second cell 2020 may broadcast information indicating a number of mobile devices which should move to frequency $f_1$. That is, the eNB of the second cell 2020 may provide redistribution factors for frequency $f_1$ and frequency $f_2$ which are usable, by the mobile devices camped on the second cell 2020, to probabilistically determine whether to stay camped on the second cell 2020 or move to frequency $f_1$ to camp on the first cell 2010. By removing any need for the mobile devices of the first cell 2010 to make any such determination, the issue of unnecessary inter-frequency mobility during load balancing does not arise. Through appropriate setting of redistribution factors, it can be seen that a group 2015 of devices determines to move from the second cell 2020 to the first cell 2010, thereby balancing the load as desired.

It will be appreciated that the example shown in FIG. 5 is relatively simplistic in that only two cells are present, and as such the decision is merely to switch or stay (as opposed there being multiple redistribution targets to move to). As a result, it is described that the eNB of the first cell 2010 does not broadcast information to the mobile devices camped on the first cell. However, according to another embodiment of the present invention, the same result could be achieved by having the eNB of the first cell 2010 broadcast information indicating (for example, through appropriately defined redistribution values) that no mobile devices should move to frequency $f_2$. However, as will be seen later when more complex environments are described (similar to that shown in FIG. 3), individual broadcasts from within each cell may prove useful in achieving load balancing across a greater number of frequencies. In particular, this may be useful in an environment whereby one cell is highly loaded and it is desirable to redistribute this load to other frequencies while ensuring that these cells themselves do not become overloaded.

FIG. 6 shows another method in accordance with an exemplary embodiment of the present invention. This method shall be described with reference to the exemplary network environment shown in FIG. 3. In particular, it is to be assumed that the second cell 220 is highly loaded initially, while the first cell 210 and fourth cell 240 are under medium load and the third cell 230 is only lightly loaded. It should be apparent that certain parts or features of the description of the method of FIG. 4 may apply to the method of FIG. 6. That is, the skilled person would appreciate that the manners in which potential targets and redistribution targets may be interpreted may also apply to this embodiment of the present invention.

In step 410, the mobile device 215 receives a broadcast from an eNB of the first cell 210. The broadcast comprises a redistribution factor for each of the three frequencies $f_1$, $f_2$ and $f_3$. The redistribution factor may be frequency specific (frequency steering) or, if more than one cell corresponds to a particular frequency, the redistribution factor may be cell specific (cell-specific steering). If cell-specific, the redistribution factor may be impingent on the mobile device 215 being in coverage of the relevant cell. To provide an example, Tables 1 to 3 shows redistribution factors included in System Information (SI) from eNBs of the first cell 210, the second cell 220 and the third cell 230 respectively.

TABLE 1

Broadcast from first cell 210

| Frequency | Cell | Redistribution factor | Timer | Remark |
|---|---|---|---|---|
| $f_1$ | — | 1 | 300 s | If outside coverage of cell 230 then no redistribution to frequency $f_2$ (may also be achieved by not broadcasting a redistribution factor for $f_2$) Example: When performing evaluation (every 300 s): 90% (9/(1 + 9)) of UEs that detect the third cell 230 will move to frequency $f_2$; Of the UEs that do not detect the third cell 230, no UEs (0/(0 + 9)) will move to frequency $f_2$. |
| $f_2$ | | 0 | | |
| $f_2$ | Third cell 230 | 9 | | |

TABLE 2

Broadcast from second cell 220

| Frequency | Cell | Redistribution factor | Timer | Remark |
|---|---|---|---|---|
| $f_1$ | — | 1 | 300 s | Example: When performing evaluation (every 300 s), assuming no cell is detected on $f_3$: 10% (1/(1 + 9)) of UEs move to $f_1$ |
| $f_2$ | | 9 | | |
| $f_3$ | — | 1 | | |

TABLE 3

Broadcast from third cell 230

| Frequency | Cell | Redistribution factor | Timer | Remark |
|---|---|---|---|---|
| $f_1$ | — | 0 | 0.1 s | No redistribution from cell 230 (may also be achieved by not broadcasting redistribution parameters from this cell) Example: When performing evaluation (every 100 ms): 0% (0/(0 + 9)) of UEs move to $f_1$. |
| $f_2$ | | 1 | | |
| $f_3$ | — | 0 | | |

In Table 1 which identifies redistribution factors indicated in SI from the first cell 210, separate redistribution factors are provided for frequency $f_2$ for both a case when the third cell 230 is detected (specific cell steering) and a case where the third cell is not detected. Contrastingly, Tables 2 and 3 only provide a more-general redistribution factor for frequency $f_2$. This indicates that load rebalancing is not intended to occur between cells corresponding to the same frequency, and that, when camped in the third cell 230, a mobile device should remain on the current frequency (and so remain camped in the third cell 230—this being the optimal cell from load distribution perspective).

With regards to the redistribution factors for frequencies $f_1$ and $f_3$ shown in Tables 2 and 3, it can be seen that no indication of a specific cell is given. As such, Table 2 describes a proportion of mobile devices which should move to frequency $f_1$ without consideration for a specific cell on this frequency (frequency steering). Upon moving, cell reselection may then be performed conventionally, for example using priority information broadcast from the network.

Additionally, for Table 3 is should be appreciate that the exemplary redistribution factors broadcast from within the third cell 230 have the effect of not redistributing the devices on the third cell 230. That is, a mobile device 215 in the third cell 230 may interpret the redistribution parameters shown in Table 3 to indicate that the percentage/proportion of devices which should move to another frequency is zero. With reference to the example shown in FIG. 5, this may also be achieved by having the eNB of the third cell 230 not broadcast any redistribution factors or information suitable for determining such. That is, instead of the third cell 230 broadcasting redistribution factors which are then used by the mobile device 215 to determine to stay on the third cell 230 (which, it will be appreciated, may unnecessarily consume device resources due to the unnecessary determination of (potential) redistribution targets), there may simply be no broadcast from within the third cell 230 and so the mobile device 215 may not be prompted to perform the (re-) evaluation in the first place.

The values shown in tables take into account the different loads on the cells. This is reflected in that the first cell 210 does not provide any redistribution factor for the second cell 220 ensuring that no mobile devices have the opportunity to move from the first cell 210 to the second cell 220. Alternatively, it can be considered that a redistribution factor of zero has been assigned to the second cell 220, thereby achieving the same effect. Furthermore, the second cell 220 indicates a redistribution factor which will result in some mobile devices moving to the first frequency (that is, camp on the first cell 210 instead of the second cell 220). However this redistribution factor is set such that only 10% of mobile devices will determine to move, preventing a situation whereby the second cell 220 becomes rapidly unloaded but at the expense of overloading the first cell 210. Additionally, the redistribution factor for the third cell 230, indicated by the first cell 210, is set to take advantage of the lightly-load of the third cell 230 and so direct a large proportion of mobile devices to move to the third cell 230 (if they can detect the third cell 230).

It will be appreciated that the "Remark" column of Tables 1 to 3 provides information regarding how the redistribution factors indicate a proportion of mobile devices which should move from one frequency to another. It should be noted that this information is intended as a guideline as opposed to any precise indication of the results of these redistribution factors. As has been previously indicated, a mobile terminal may only be able to detect cells for which the mobile terminal is within the coverage area of. FIG. 3 demonstrates the small cell nature of the fourth cell 240 in comparison to the other cells, and so allows for the coverage of the fourth cell 240 to be much smaller. As indicated by Table 1, the redistribution factors may therefore take into account the reduced coverage of the third cell 230. An example as to how the redistribution factors of Table 1 may be used will be shown below with reference to Table 4.

The "Remark" column indicates the percentages of devices which are intended to stay or move for the corresponding redistribution parameters. With reference to Table 1, as can be seen for frequency $f_1$, the redistribution factor of '1' indicates that 10% of devices should remain on frequency $f_1$ (and so the first cell 210). As will be seen in more detail below, this value of '1' is used in combination with a value of '9' for the redistribution factor corresponding to the third cell 230 on frequency $f_2$—this indicating that 90% of devices which can detect the third cell 230 should move to frequency $f_2$. The relationship between these redistribution factors and the percentages can be seen through comparison when considering a situation whereby the third cell 230 is out of range of a mobile device camped in the first cell 210. That is, the redistribution factor for $f_1$ is only 10% of the sum of the redistribution factors for $f_1$ and $f_2$ (third cell 230). However, when the third cell 230 is out of range, 100% of devices will remain on frequency $f_1$ and so stay camped on the first cell 210. This is achieved by setting the redistribution factor for the second cell 220 as '0', meaning that, when a device camped in the first cell 210 detects the first cell 210, the second cell 220 but not the third cell 230, there is a 0% chance 0/(0+1)) that the device will move to the second cell 220.

Upon receiving the broadcast, the mobile device 215 may determine a plurality of frequencies for moving to in step 420. In view of the exemplary information shown in Tables 1 to 3, the mobile device 215 may determine that one of frequencies $f_1$, $f_2$ and $f_3$ may be selected.

In certain embodiments, upon determining the plurality of redistribution targets (and identifying redistribution factors) or even prior to such (thereby indicating that the order of the steps in FIG. 6 should not be considered as absolute), the mobile device 215 may generate a (pseudo)random number. With reference to the description regarding step 330 of FIG. 4, this random number may be used in a probabilistic determination made by the device as will now be described. The random number may be generated within a certain range, for example between a value of 0 and 1. However the skilled person will appreciate, from the following description as to how this random factor is used, that other options for generating such a suitable factor exist.

In addition to generating a random number, the redistribution factors corresponding to the determined cells are used to generate sub-ranges corresponding to each cell, wherein the sub-ranges each form part of the range according to which the random number is generated. For example, to generate the sub-ranges, the redistribution factors of all determined cells may be summed together, and then the redistribution factor of each cell may be represented as a proportion of this sum. Referring now to Table 4 below:

Table 4 demonstrates the generation of sub-ranges corresponding to three different cases for the mobile device 215. In the first case, a mobile device 215 is camped on the second cell 220 and assumed to not support the frequency corresponding to the fourth cell 240. Therefore the only determined redistribution targets are the first cell 210 and the second cell 220. The sum of the redistribution factors of the suitable cells is therefore 10, and the individual sub-ranges generated will represent that the sub-range of the first cell 210 should correspond to 10% of the range, while the sub-range of the second cell 220 should correspond to 90% of the range. The skilled person will appreciate that there are a number of ways in which a range may be portioned off according to these sub-ranges. The relevant matter is that, for these sub-ranges, there should be a 10% chance that the random number falls into the sub-range corresponding to the first cell 210, and a corresponding 90% chance for that corresponding to the second cell 220. As will be apparent, these generated sub-ranges correspond to the "Remark" shown in Table 2. That is, if all mobile devices currently camped on the second cell 220 perform the evaluation as to whether or not to move, then 90% of the mobile device will determine to remain camped on the second cell 220 of frequency $f_2$ while 10% will determine to move to frequency $f_1$ and camp on the first cell 210.

In a second case, referring now to Table 1, a mobile device 215 is camped on the first cell 210 and is within the coverage of the third cell 230. Here, it is determined that the first cell 210, the second cell 220 and the third cell 230 are redistribution targets (note that information regarding the fourth cell 240 has not been provided in this example, but the effect of such can be readily comprehended). The sum of the redistribution factors is 10, and so sub-ranges 1/10 and 9/10 corresponding to the first cell 210 and third cell 230 respectively are generated. No sub-range is generated for the second cell 220 on frequency $f_2$ to ensure that no mobile device may determine to move to this cell. Here, mobile devices either chose to remain on the first cell 210, or are cell-specifically steered to the third cell 230

In the third case, also referring to Table 1, a mobile device 215 is camped on the first cell 210 and is out of range of the third cell 230 (or the third cell 230 is determined to not be the highest ranked cell on frequency $f_2$). As such the mobile device 215 determines the first cell 210 and the second cell 220 as the redistribution targets. In this example, it is shown that the second cell 220 may be determined as a redistribution target but a corresponding redistribution factor, identified by the mobile device 215, is either not indicated by the first cell 210 to the mobile device 215 or, in Table 1, is set at zero. As can be seen, this results in the sub-range for the first cell 210 corresponding to the entire range. As such it is

TABLE 4

| Case | Candidates | Sub-range | Remark |
|---|---|---|---|
| UE1 (camped on second cell 220) | $f_1$, $f_2$, $f_3$ | $f_1$: 1/10, i.e. 10% <br> $f_2$: 9/10, i.e. 90% | UE not supporting frequency $f_3$ (i.e. not supported by its Radio Frequency specific hardware) |
| UE2 (camped on first cell 210) | $f_1$, $f_2$, $f_2$ (third cell 230) | $f_1$: 1/10 i.e. 10%; <br> $f_2$: 0/10, i.e. 0%; <br> $f_2$ (third cell 230): 9/10, i.e. 90% | Within coverage third cell 230 |
| UE3 (camped on first cell 210) | $f_1$, $f_2$ | $f_1$: 1/1, i.e. 100% <br> $f_2$: 0/1, i.e. 0% | Outside coverage third cell 230 |
| UE4 (camped on second cell 220) | $f_1$, $f_2$, $f_3$ | $f_1$: 1/11, i.e. 9% <br> $f_2$: 9/11, i.e. 82% <br> $f_3$: 1/11, i.e. 9% | | indicated that no mobile device should move from the first cell 210 (frequency $f_1$) to the second cell 220 (frequency $f_2$), ensuring that the second cell 220 load does not increase.

Finally, in the fourth case, referring again to Table 2, a mobile device 215 is camped on the second cell 220 and this time supports all three frequencies $f_1$, $f_2$ and $f_3$. As a result it can be said that the mobile device 215 determines the first cell 210, the second cell 220 and the fourth cell 240 as the redistribution targets. As can be seen from Table 4, the sub-range generated for frequency $f_2$ (the second cell 220) dominates and so it is likely that the mobile device 215 will determine to remain on the current frequency. However, it will be appreciated that an amount of devices will determine to move to a cell on frequency $f_1$ (e.g. the first cell 210) or to a cell on frequency $f_3$ (e.g. the fourth cell 240).

As mentioned above for the first case, the mobile device may not determine the fourth cell 240 as a redistribution target. That is, even though information indicating a redistribution factor for frequency $f_3$ may be included in the broadcast from the second cell 220, the mobile device 215 may not determine the fourth cell 240 to be a redistribution target, or even may not determine frequency $f_3$ to be a redistribution target. For the former, this may be due to the fourth cell 240 being out of range (for example, the mobile device 215 may not consider cells which do not have sufficiently good radio quality (that is, do not meet the S-criterion)), and so undetectable by the mobile device 215. For the latter, this may reflect that frequency $f_3$ is not supported by the mobile device 215, and so the mobile device 215 does not consider the fourth cell 240 to be a redistribution target.

As mentioned above, the prompt for performing the evaluation as to whether to move to another frequency may take a variety of forms. One such prompt or trigger has been described in the method illustrated in FIG. 6, however it should be appreciated that this is not the sole trigger. Furthermore, it should also be appreciated that the broadcast including the information from which redistribution factors may be identified may not necessarily trigger performance of the evaluation. That is, this broadcast may simply provide the information, but not cause the mobile device 215 to determine whether to move to a determined redistribution target.

For example, it has been described above that the information from which redistribution factors is identified may be stored in a mobile device (although this is not required in certain embodiments of the present invention). That is, at some point, mobile device 215 may have received a suitable broadcast from within the first cell 210 and stored this information in some form of memory. As a result, the mobile device 215 is not reliant on receiving a broadcast from the first cell 210 (upon which it is assumed to be camped) to enable the mobile device 215 to determine whether it should move to another cell. This may be particularly relevant for network environments where it is not expected that the redistribution factors for each cell will change over time, such that new information would need to be received to ensure ideal balancing.

Alternatively, the information broadcast by the first cell 210 may be sufficiently complete so as to provide redistribution factors for each neighboring cell to correspond to a variety of envisaged situations. For instance, the information could define redistribution factors for each cell depending on a current time (thereby dealing with any fluctuations during peak times), or could define redistribution factors which correspond to a current location of a device (and so potentially accounting for the relative coverage of each cell and anticipating that the device may potentially leave coverage of one (or more) of the cells). However, it will be appreciated that the eNB can update redistribution factors whenever needed, and so such complexity as just described is not necessary for the operation of the corresponding embodiments of the present invention.

As indicated above, the mobile device 215 may perform the evaluation when it is prompted by something other than a broadcast from the eNB of the first cell 210. For instance, according to certain embodiments the mobile device 215 will perform the evaluation due to mobility on the part of the mobile device 215. That is, for example, when the mobile device 215 enters an area that applies idle load control, when the mobile device 215 leaves the coverage area of the first cell 210 (or whichever cell it is currently camped on) etc. Here, upon cell change, the mobile device acquires system information which includes new redistribution factors, and then may perform the evaluation using these new redistribution factors. In this instance, the mobile device is prompted to perform the evaluation by receipt of the new redistribution factors.

In an exemplary embodiment, the mobile device 215 may determine that it has entered a different load control situation (for example, entered a different coverage zone) by detecting changes in the redistribution factors (load distribution parameters). This may be in accordance with a situation where the broadcast comprising the information from which the redistribution parameters may be ascertained does not also automatically prompt the mobile device 215 to perform the evaluation. Upon detecting these significant changes (e.g. larger than some configured threshold), however, the mobile device 215 may determine to perform the evaluation such that it determines whether or not it should move to camp on a suitable cell in an idle mode. Alternatively, particular load control areas may be configured by the network to trigger the re-evaluation by the mobile device 215.

It will be appreciated that this mobility-based prompting, or determining to performed the evaluation upon every cell change, may not always be desirable due to, for example, it resulting in 'ping-ponging' by the mobile device 215 (that is, moving from one cell to another only to move back to the original cell). Additionally, due to the nature of the redistribution factors (that is, the fact that they essentially indicate an amount of mobile devices that should move from the cell on which they are currently camped to another suitable cell), load balancing control may be difficult because small percentages may result in significant redistribution of devices. That is, the issue here is that redistribution depends on mobile device mobility. As such, if devices move frequency (for example, changing cell every 10 seconds) then the procedure is triggered frequently and so the percentages of devices to move must be kept low to obtain a reasonable redistribution rate.

A solution to these issues is to introduce a prohibit timer. This timer is started when the mobile device 215 performs the evaluation; for instance, when the mobile device 215 is prompted to perform the evaluation or when the mobile device 215 has determined whether to stay on a current cell or move to another cell. That is, in these latter embodiments the prohibit timer is started when the mobile device 215 performs the evaluation as a result of device mobility prompting such, as described above. So long as the prohibit timer is running, the mobile device 215 may not perform another evaluation. In certain other embodiments, a running prohibit timer prevents the mobile device 215 from performing the evaluation as a result of mobile device mobility 215

(that is, as a result of the mobile device 215 leaving the cell it is camped on), but it will be appreciated that there may be other prompts which still result in the mobile device 215 performing the re-evaluation. In other embodiments, while the prohibit timer is running the mobile device 215 may not perform the evaluation upon receiving updated redistribution factors from an eNB broadcast when the mobile device remains in its current cell (that is, changed redistribution factors broadcast from within a currently camped-on cell). In yet further embodiments, while the prohibit timer is running the mobile device may not perform the evaluation when receiving new redistribution factors from a broadcast. As will be described below, the prohibit timer may be combined with a periodic timer (or the functions of a periodic timer) which relates to triggering the idle mode balancing evaluation.

In addition to resulting from device mobility, the network (cell, E-UTRAN, base station etc.) may trigger the mobile device 215 to perform the evaluation separately to broadcasting the information from which redistribution factors may be identified. That is, the network may simply page the mobile device 215 (and other devices in the network/environment) to trigger the re-evaluation. This page could be a specific request to perform the evaluation, or an indication that the broadcasted load parameters or information from which the redistribution factors are identified/obtained has changed. Upon receiving this indication of change in the information, the mobile device 215 may determine to re-evaluate according to the changed redistribution factors. In certain embodiments, a network request may include redistribution factors separate from the broadcast signalling.

For this redistribution upon network evaluation, the network may, in certain embodiments, include information related to dispersion in the time domain. That is, the eNB of a serving cell may provide, to the mobile device 215, dispersion in the time domain which may be used by the mobile device 215 for delaying performing of the (re-)evaluation. This mechanism may mitigate any signalling peak resulting from many mobile devices performing the evaluation at (approximately) the same time. For example, if the eNB broadcasts a request to initiate re-evaluation to a number (e.g. all) devices currently camped on the cell associated with that eNB, then all of the devices could start performing measurements etc. which may result in a signalling peak (e.g. re-distribution involving change of Tracking Area). By including dispersion information, the devices may instead perform the re-evaluation at different times, or at least over a larger window of time. For instance, upon receiving the information related to dispersion in the time domain, the mobile device 215 may draw a random value and, based on that random value, select a delay value from a certain range. Instead of triggering the re-evaluation (for example, by stopping a periodic timer—see below) immediately, it delays this with the concerned time.

According to certain embodiments of the present invention, another trigger which may prompt the mobile device 215 to perform the evaluation is the use of a periodic timer. This periodic timer may function separately to the above-described prohibit timer, or the two may be combined in some manner to provide the necessary functionality. In the case of the former, the periodic timer, as the name suggests, ensures that the mobile device 215 periodically performs the evaluation. It will be appreciated that, in certain embodiments, if the periodic timer (or the periodic feature of a combined timer) expires while the prohibit timer (or the prohibit feature of the combined timer) is still running, the mobile device 215 may perform the evaluation. If it is considered that each mobile device in the environment is performing the evaluation in a periodic manner, it should be apparent that the idle mode load can be continuously balanced in a substantially ideal manner. An embodiment according to this method shall now be described with reference to FIG. 7.

FIG. 7 illustrates an embodiment of the present invention demonstrating several triggers for performing (re-)evaluation. In step 510, the mobile device 215 starts the periodic timer. In certain embodiments, this action may follow from the mobile device 215 having performed an evaluation, reselected a current cell or redistributed to another cell. That is, the steps shown in FIG. 7 may flow from step 450 of FIG. 6.

How the periodic timer may be set or determined will be readily understood by the skilled person. For instance, the periodic timer might be specified by a device manufacturer, by a service provider, by a network operator etc. Furthermore, the periodic timer may be changed, reset or modified; for example as a result of received system information provided by a suitable source (such as the network), control information etc.

Furthermore, it will be appreciated that in the example shown in FIG. 7 a prohibit timer may also be running. That is, in accordance with the above, the mobile device 215 may have changed cell due to mobility, and so a prohibit timer was started to prevent ping-ponging back to a previous cell.

Furthermore, it will be appreciated that the periodic timer and the prohibit timer may be provided as a combined timer. In this case, it will be understood that certain parts of the method described in FIG. 7 may be merged or combined in an appropriate manner. For example, in step 510 when the periodic timer feature of a combined timer is started, the prohibit timer feature of the combined timer may already be running due to a previous performance of the evaluation which was triggered by mobile device mobility.

In step 520, broadcast redistribution factors are received from the network (eNB of currently camped cell). These redistribution factors may be received due to the mobile device entering a new cell (mobility) or as a result of changed broadcast information from the network.

In step 530, a check is made as to whether the prohibit timer is expired. If the timer has expired, then the mobile device 215 may proceed to step 570 where the evaluation is performed using the new redistribution factors. If the prohibit timer has not expired then the mobile device 215 is prohibited from performing the evaluation, thereby preventing ping-ponging between cells and excessive measurement.

In step 540, a check is made as to whether the periodic timer has elapsed. If the result is that the timer has elapsed, the mobile device 215 may be triggered to perform the evaluation to determine whether or not the mobile device 215 should move to another cell, thereby proceeding to step 570. In certain embodiments, to perform this evaluation the mobile device 215 may use redistribution factors identifies from information received from the current cell In step 540, a check is made as to whether the mobile device 215 has received a network initiated request (or page) for performing the evaluation. Such as request may be allowed to override the periodic timer, thereby prompting the mobile device 215 to perform the evaluation. This is shown in FIG. 7 in step 570. This ability to override the effects of the periodic timer may be regarded as a fall-back mechanism, by which a cell may be able to cause the redirection of the mobile devices camped on the cell without needing to wait for the timer to elapse.

If no network initiated request is received, a check is made in step 560 as to whether the mobile device 215 leaves the current cell. This step reflects the mobility-based trigger described above, and may allow for the mobile device 215 to be suitably re-distributed when leaving the coverage of the distribution target upon which it was previously camped. The result of this check may also depend on the status of the prohibit timer, and also the relationship between a new cell selected by the mobile device 215 and the redistribution target that was previously chosen by the mobile device 215. That is, upon cell change the mobile device 215 does not perform the (re-)evaluation if the prohibit timer is running (preventing ping-ponging). However, if the new cell selected by the mobile device 215 is outside coverage of the previously chosen redistribution target, then the timer is stopped and the mobile device 215 may perform the evaluation in step 570.

Alternatively, if the mobile device 215 selects a new cell outside coverage of the previously chosen redistribution target, then the mobile device 215 may return to the original frequency upon which it was camped (that is, the frequency upon which it was camped prior to the redistribution which triggered the periodic timer to start in step 510).

If the redistribution target is not left, the method repeats from a previous step. It will be appreciated that the checks shown in steps 520 to 560 do not need to be performed in a specific order, nor is it intended that the different checks are given different priorities. The mobile device 215 may be continuously monitoring for the occurrence of one of the re-evaluation triggers capable of overriding the periodic timer. For example, if the mobile device determines that the periodic timer has not elapsed and then receives broadcast redistribution factors, it may immediately determine whether the prohibit timer has expired instead of checking for a network request.

It will be appreciated that some of the checks described in FIG. 7 may be omitted. For example, step 560 could be omitted, thereby removing the override caused by the mobility of the mobile device 215. Additionally, it will be appreciated that the mobile device 215 being in a state where the prohibit timer or periodic timer is running may result in some of the triggers shown in FIG. 7 being prevented from resulting in evaluation. That is, embodiments may be considered where a network request is ignored if the periodic timer is running, for example. Similarly, it will be appreciated that other overrides may exist, and so additional checks could be involved while the periodic timer is running to determine whether the timer should be abandoned and the evaluation performed.

For illustrative purposes, an additional or alternative manner in which to consider the use of periodic and prohibit timer features is by considering two different states, one of which the mobile device may be considered to be in at a given time. A first state may be defined as a state in which a combined timer (in accordance with the above description of such) is not running. A second state is a state in which the combined timer is running. When in the first state, if the mobile device 215 receives redistribution factors (for example, detects a broadcast from an eNB of a current cell), then the mobile device 215 may perform the redistribution evaluation, start the timer (periodic timer feature, for the performance trigger mentioned) and so move to the second state. While in the second state, the mobile device 215 will change to the first state when the timer expires, upon receiving a network request (page) or when leaving the redistribution target area.

The above, state-based interpretation is illustrated in FIG. 8. Here, it is shown that the timer is started upon receipt of redistribution factors which results in the mobile device 215 moving to the second state where the timer is running. Then, various events are indicated (no emphasis or requirement is placed on the ordering of these events in the figure) which may cause the mobile device 215 to transitioning back to the first state. The checks for these various events may themselves repeat until one of them returns the result which causes the mobile device to move back to the first state. For illustrative purposes, it is then shown that, at a future time when in the first state, the process may repeat in the same manner when redistribution factors are received again. It should be appreciated that, according to certain embodiments related to certain described above, that if the mobile device 215 receives the redistribution factors while in the second state then nothing happens—i.e. no redistribution evaluation is performed. It will be appreciated that, according to certain embodiments, when the mobile device 215 transitions from the second state to the first state as a result of receiving a network request or the mobile device 215 leaving the target area, the timer may be stopped. Additionally, for the check as to whether timer expiration is detected, if the result is positive then the timer will have expired (already be stopped) upon transitioning to the second state. Furthermore, it should also be appreciated that embodiments exist whereby the timer is stopped upon the mobile device 215 transitioning from the second state to the first state. For instance, upon leaving the target area the mobile device 215 may stop the timer upon transitioning to the first state.

Again, it should be highlighted that FIGS. 7 and 8 do not describe the sole methods by which the period and prohibit timers or combined timer may be implemented, but instead merely provide an example to demonstrate potential functionality of embodiments of the present invention.

According to certain embodiments of the present invention, the periodic timer may be set differently by each cell (or, more precisely, by the eNB of each cell). With reference to Tables 1 to 3, it can be seen that, as well as indicating different sets of redistribution factors, the information from each of the first to third cells 210-230 also indicates a (periodic) timer. The system information of the first cell 210 and the second cell 220 indicates a timer value of 300 seconds, while that of the third cell indicates a timer value of 0.1 second. As a result, devices which are camped on the third cell 230 may periodically perform a re-evaluation more frequently than those camped on the first or second cells 210-220. This is described in the "Remark" column.

Furthermore, when moving to a new cell (as a result of determining a redistribution target to move to using redistribution factors from a previously camped-on cell), a mobile device 215 may use the periodic timer value of the new cell to determine when to next perform a periodic evaluation. Therefore the timer value may update whenever the serving cell changes (thereby updating the end-time of the timer). Alternatively, when completing the evaluation, the timer can be started with a value acquired from the resulting cell (but not updating the end-time). For example, if the mobile device 215 is redistributed to a cell on a new frequency, the cell may indicate a timer value which is lower than that indicated by the cell which the mobile device moved from. In this case, the timer value could potentially be sufficiently lower that the mobile device 215 determines that the timer should already have expired. In this event, as should be evident from the above alternatives, the mobile device 215 may or may not update the end-time of the periodic timer according to the how it is configured to behave.

According to certain embodiments of the present invention, it should be noted that the mobile device 215 performs the evaluation for all determined redistribution targets together and not in consideration of a timer value associated with a particular redistribution target. That is, the mobile device 215 cannot apply a different timer depending on whether the redistribution target is a specific frequency or a specific cell on the specific frequency, and then, upon expiration of a specific cell timer, only perform a re-evaluation for those redistribution targets which relate to specific cells.

According to certain embodiments of the present invention, the periodic timer may be differently defined depending on the trigger which caused the mobile device 215 to perform the evaluation prior to starting the periodic timer. That is, the mobile device 215 may re-evaluate upon leaving coverage of a currently camped cell and start of periodic timer of a first duration; and the mobile device 215 may re-evaluate upon receiving a network page and start a periodic timer of a second duration. The periodic timer may therefore be tailored according to the circumstances surrounding a re-evaluation, and also according to attributes of the device, the network, detected cells etc.

The periodic timer may also be used when considering how the mobile device 215 should actually move to another frequency (another cell).

One option for how the mobile device 215 moves can be termed a one shot push, where the mobile terminal 215 simply moves to or is moved to a cell on the chosen frequency. The one shot method may result in ping-ponging whereby the mobile device 215 may immediately 'pong' back to the frequency or cell on which it was originally camped. This 'ponging' may result from a re-evaluation performed by the mobile device 215 upon camping on the new cell. This behaviour may not be ideal, and may arise when the different frequencies available are assigned similar if not equal priorities. To mitigate the issue of ping-ponging for a one shot push, rules may be established whereby the mobile device 215 does not redistribute to a cell on the chosen frequency if the link is poor such that the mobile device 215 must perform additional measurements. That is, the movement to a new cell may only be done if a cell of that redistribution target is of good quality so it is likely that the mobile device 215 can camp there for a certain period of time. If the radio link is bad, then the mobile device 215 may start measurement of neighbours to ensure it can move to one of these neighbours when necessary. For further information, refer to information provided at the end of the detailed description.

Another option for how the mobile device 215 moves cell can be described as a continuous push, where the mobile device 215 prioritises the redistribution target for a defined period, which may be set according to the periodic timer. This may ensure that the mobile device 215 is kept on an unloaded (or less-loaded) cell which has resulted from the performance of the evaluation. This may be maintained for as long as a periodic timer is running, and so is maintained for the period in which the mobile device 215 is prohibited (or discouraged) from moving or being redistributed. For example, while the mobile device 215 is redistributed (and so the periodic timer (or prohibit timer) is running), the mobile device 215 should consider the chosen redistribution target to be highest priority of all equal priority suitable cells (or suitable frequencies). The continuous push method therefore does not lead to the same ping ponging issue which may potentially result from the one shot push method. Note that if the redistribution target involves cell-specific steering for the mobile device 215 to move, the mobile device 215 may only apply this prioritization if in good coverage of the specified cell.

It was previously mentioned that the idle mode balancing methods may be intended to co-operate with pre-existing cell selection policies (for example those specified based on subscription or device capabilities). Certain embodiments of the present invention where continuous push is used may therefore be improved by further adaptations to ensure that conflict with pre-existing policies is mitigated or prevented, while at the same time reducing any ping ponging between frequencies or cells that could occur if the one shot push was used instead (where it may be assumed that the one shot push method makes it easier for pre-existing policies to assert their effects on the mobile device).

For example, if the mobile device 215 considers frequency preferred from a load perspective to have the highest priority, then it should be ensured that a redistribution method in accordance with that described above does not result in the mobile device moving in an opposite manner to this frequency-preferred policy. To reduce the chances of this type of situation occurring, the mobile device 215 may be configured to only consider load distribution across cells of equal priority. That is, when determining redistribution targets to which the mobile device 215 may be redistributed, a cell may be found suitable only if it has equal priority to that of the highest priority cell.

That is the network configures steering redistribution parameters only for frequencies of equal priority as serving frequencies. If the mobile device decides to move, it considers that cell to be of highest priority but only across the frequencies of this priority level. For example, if the serving cell is priority level 3, then the mobile device 215 may consider this priority to be 3.999' due to the result of the evaluation. It would then apply normal rules regarding priorities (for example, for reselection) and consider the target frequency to be higher priority than frequencies with priority level 3 but still lower priority than frequencies with priority level 4.

In embodiments of the present invention where these considerations are taken into account, it may therefore be apparent that ensuring ideal load balancing should not always be achieved to the detriment of network efficiency as a whole, and the individual requirements of the cells and mobile devices should be taken into account.

According to certain embodiments, a priority may also be configured as part of the redistribution parameters for a specific cell (candidate distribution target). This could be the priority level the mobile device 215 should assume for the concerned redistribution candidate, or the priority level for which the mobile device should consider the redistributed frequency to be higher priority (but lower than the next priority level). For instance, similar to the above example, suppose serving cell is priority level 3, the network might specify priority level 4 for the redistribution target. In such case the mobile device 215 considers the priority of the target to be higher than any frequency with priority level 4 but lower than 5 e.g. 4.999.

Additionally, regarding cell-specific redistribution and the continuous push method, the mobile device 215 may also consider the selected cell to be highest priority of all equal priority suitable redistribution targets. Here, however, this prioritisation may be applied only when the concerned cell (the selected cell) is the best cell on the frequency.

The above example, regarding mitigating the problem of ping-ponging, may appear more-appropriate to the case of frequency steering due to the concerns involved in switching to a cell on a different frequency. However, this is not to say that the use of a periodic timer for the case of cell-specific steering is unnecessary or has no purpose. According to certain embodiments of the present invention, the mobile device 215 may be configured to use a shorter timer or low timer value for cell-specific redistribution in certain situations (for example, see Table 3). For example, if the mobile device 215 initially camps on a small cell, such as the third cell 230 described above, and then leaves the coverage of the small cell, it may move instead to a surrounding macro cell on the same frequency, such as the second cell 220 described above. This macro cell may be heavily overloaded such that this movement is not ideal, and as a result it would be prudent for the mobile device 215 to stay on the macro cell for only a short time. As indicated above, this may be achieved by setting the periodic timer to a low value (Table 3 gives the example of 100 ms) such that the mobile device is sooner prompted to perform the evaluation and so be moved to a less-loaded more quickly. That is, when the mobile device 215 leaves the third cell 230 and enters the second cell 220, it should quickly re-evaluate in order to quickly return to the first cell 210 (by "return", it is envisaged that the mobile device 215 may have previously been redistributed to the third cell 230 from the first cell 210).

With reference to the above, a suitable method for achieving this may be that described above whereby the mobile device 215, upon completing the evaluation, starts a periodic timer with a value acquired from the cell resulting from the evaluation but without updating the end-time. That is, when leaving the third cell 230 the end-time would not be updated to reflect the longer timer value of the second cell 220 (referring to the exemplary values shown in Tables 1 to 3).

Alternatively, the method whereby the end-time of the timer is updated when the serving cell changes may be implemented so long as it includes a mechanism of stopping the timer when the redistribution target is left. That is, considering the third cell 230 to be the redistribution target of the mobile device 215 (for example, resulting from a previously performed evaluation), when the mobile device 215 leaves the third cell 230 it stops the timer such that a re-evaluation may be performed—allowing for redistribution to frequency It will be appreciated that the periodic timer may be configured according to cell-specific steering or frequency steering, in addition to the other factors mentioned previously.

As mentioned previously, the mobile device 215 may achieve this by considering a selected cell or selected frequency (selected redistribution target) to have the highest priority within a reference priority level. It will be appreciated that such a level may be set or configured in a number of ways within the network. For example, the reference priority level may be the priority level of the frequency or cell upon which the mobile device 215 was initially camped. Alternatively, the reference priority level may be configured by the network itself. As another option, the reference priority level may simply be taken as the highest priority overall in the network. As a result, when the mobile device 215 is camped on the selected cell or frequency, frequencies of other redistribution targets are considered to be lower priority. Potentially (that is, in certain embodiments), this consideration may be made only as long as the periodic timer or prohibit timer is running.

A factor which should be taken into consideration for various embodiments of the present invention is the avoidance of a measurement burden. This is important to consider so as to ensure that a battery of a mobile device is not unnecessarily drained or consumed. Considering only the first to third cells 210-230 shown in FIG. 3, unless frequency $f_2$ is considered higher priority, the mobile device will only measure while serving frequency becomes bad. However, if $f_2$ is considered higher priority, performance requirements for detecting or measuring cells on a mixed layer (a frequency layer to which multiple cells correspond) place a burden on the mobile device. This problem may be more apparent for certain embodiments of the present invention, as situations exist in which the mobile device is likely to stay mostly on the lower priority layer (this being battery consuming). That is, the mobile device 215 should always try to reselect higher priority layer but, when on a good cell, it does not need to measure lower or equal priority layers. Additionally, while the mobile device should try to go to a small cell on another frequency, this should not result in the mobile device 215 measuring that frequency continuously. For further information, refer to the information provided at the end of the detailed description.

It is known that longer detection times, corresponding with reduced measurement performance, will not seriously affect the use of an unloaded small cell. Correspondingly, because load distribution is typically a slow process, longer detection times are acceptable. Furthermore, embodiments of the present invention may account for any failure to detect the small cell (third cell 230) resulting from the longer detection times by modifying a redistribution factor for the small cell appropriately. That is, this effect of lower detection times could be mitigated by ensuring that the redistribution factor indicates a larger number of mobile devices that should move to the small cell.

Another solution to this problem may be that, only when (re-)evaluation is triggered, the mobile device performs measurement of the frequencies for which redistribution factors (parameters) are configured, if not measured so far (that is, an immediate cell detection/evaluation type of action). The frequency of this detection/evaluation action may be once every few minutes, and a measurement for the purpose of this cell detection/evaluation may be introduced. If the current cell is of good quality, according to current rules (refer again to the information provided at the end of the detailed description for further detail as to this) the mobile device 215 is not required to measure neighbouring cells. Such measurements are, however, needed for load distribution. As load distribution is a slow process i.e. evaluated infrequently, the mobile device 215 may simply perform a one-shot measurement of the frequencies for which redistribution parameters are provided at the time when such evaluation is performed.

For example, in the case of redistribution towards a small cell such as the third cell 230, the mobile device 215 can consider the frequency to be higher priority but with reduced measurement performance. For instance, assuming that the macro cell (the second cell 220) will typically be detected on the mixed frequency $f_2$, measurement performance may be reduced. Here, "reduced" measurement performance may relate to the measurements (defined in 3GPP standards) having different performance requirement levels (normal and reduced). These performance requirements cover aspects such as how long it takes to detect a new cell, for example. "Reduced" performance may support mobility to small cells on other frequencies without consuming too much of the battery of the mobile device, for instance by avoiding having the mobile device constantly measuring such preferred cells. The current mechanism for reduced performance as defined in 3GPP standards may be further enhanced for idle load distribution i.e. not requiring the mobile device to measure detected cells every 1.28 or 2.56 seconds.

Another method by which the measurement burden on the device may be eased is to introduce a mechanism to facilitate fall-back to an original cell or frequency upon which the mobile device was camped, when the mobile device leaves a redistribution target. That is, when redistributed to a cell on the basis of cell specific redistribution, if the redistributed cell falls below a threshold which triggers the start of intra-frequency measurements by the mobile device, then the mobile device also starts inter-frequency measurements. This may facilitate the mobile device moving back to an initial frequency instead of moving to a different cell in the same frequency which may be overloaded.

For example, a mobile device 215 is initially camped on the first cell 210 and, upon performing the evaluations, is redistributed to the third cell 230. Then, at some point the signal from the third cell 230 becomes low which results in the mobile device 215 moving to another cell. If the second cell 220 (on the same frequency as the third cell 230) is under heavy load (which is likely in the case of cell-specific steering)), it may be more suitable for the mobile device 215 to move back to the first cell 210 instead of camping on the overloaded second cell 220. Therefore, when performing measurements to find a new cell, the mobile device 215 does not perform only intra-frequency measurements but also inter-frequency measurements, thereby creating the option of moving back to the first cell 210.

In the above description, the skilled person would appreciate the various methods by which information or data relating to redistribution factors, periodic timers, prohibit timers, combined timers, redistribution priority etc. may be broadcast, if necessary. For example, with reference to 3GPP specification TS 36.304 (current most recent version is Rel-12, version 12.5.0 available Aug. 7, 2015) and related information (where it is clearly not intended for the present invention to be limited to this), the SystemInformation-BlockType3 information element may be modified to provide any necessary information. The IE SystemInformation-BlockType3 contains cell re-selection information common for intra-frequency, inter-frequency and/or RAT cell re-selection (that is, applicable for more than one type of cell re-selection but not necessarily all) as well as intra-frequency cell re-selection information other than neighbouring cell related. To this system information element may be added fields indicating, for example, a redistribution factor. Upon receiving such information, a mobile device would be able to identify the necessary information to determine any redistribution factors, and also identify potential targets and so redistribution targets. Similarly, information may be provided which allows the mobile device to determine a target in the case where there are multiple targets, this information relating to a priority order for ranking the different targets.

Furthermore, the IE SystemInformationBlockType5 information element may also be modified to include fields relating to the information involved in embodiments of the present invention. The SystemInformationBlockType5 element contains information relevant only for inter-frequency cell re-selection, that is, information about other E-UTRA frequencies and inter-frequency neighbouring cells relevant for cell re-selection. The IE SystemInformationBlockType5 includes cell re-selection parameters common for a frequency as well as cell specific re-selection parameters. As for the SystemInformationBlockType3 element, the skilled person would appreciate how the SystemInformationBlock-Type5 element may be modified to provide the necessary signalling information to mobile devices.

The following information is provided to aid in understanding various embodiments described above, for instance how certain device performance may be achieved. The skilled person would understand how this information may be relevant in the field of the invention. Additionally, any numbers are to be considered for illustrative purposes only and any rules/requirements may pertain to relevant embodiments of the present invention only, as would be understood by the person skilled in the art.

Measurements rules for UE:

If serving cell fulfils Srxlev>SIntraSearchP and Squal>SIntraSearchQ, not required to measure intra-frequency nCells.

If serving cell fulfils Srxlev>SnonIntraSearchP and Squal>SnonIntraSearchQ, not required to measure equal & lower priority interF/interRAT nCells.

Higher priority interF to be measured always.

UE reselects a neighbour if: (a) Conditions are met for Treselect & UE entered serving cell at least is ago; (b) Higher priority (interF/interRAT), that is—Target nCell Squal>ThreshX, HighQ/P; (c) Equal priority, that is—Target nCell ranked better than serving; and (d) Lower priority (interF/interRAT), that is—Serving Squal<ThreshServing, LowQ/P and target nCell Squal>ThreshX, LowQ/P.

Furthermore:

UE supporting incMon shall support measurement of at least 3 interF E-UTRA carriers with normal performance.

Detection of higher priority cells: (a) Background search: If serving fulfils cell $S_{rxlev}>S_{nonIntraSearchP}$ and $S_{qual}>S_{nonIntraSearchQ}$, UE shall measure higher priority interF at least every $T_{higher\_priority\_search}$. $T_{higher\_priority\_search}=(60*N_{layers})$ with $N_{layers}$ the number of high priority freqs (covering all RATs). and (b) Otherwise: Normal performance: detect in $K_{carrier,normal}*T_{detect,EUTRAN\_Inter}$. Reduced performance: detect in $6*K_{carrier,reduced}*T_{detect,EUTRAN\_Inter}$. $K_{carrier,normal}$ is number of carriers configured not part of ReducedPerformance-Group Measurement of detected higher priority cells: To be measured every $T_{measure,E-UTRAN\_Inter}$ (i.e. every 1.28 or 2.56 s). Unfortunately no reduced performance for measurement of detected cells.

Evaluation of detected cells: (a) Normal performance: detect if reselection criteria are met within $K_{carrier,normal}*T_{evaluate,E-UTRAN\_Inter}$. $T_{evaluate,E-UTRAN\_Inter}$ is 5.1-7.6 s; and (b) Reduced performance: detect if reselection criteria are met within $6*K_{carrier,reduced}*T_{evaluate,E-UTRAN\_Inter}$.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for performing an idle mode redistribution evaluation by a mobile device in a mobile communication network, the method comprising:
   determining a plurality of redistribution targets, each of the plurality of redistribution targets corresponding to a different frequency and comprising at least one cell within which the mobile device can camp on in an idle mode in the mobile communication network;
   identifying, using information received from a first cell of the mobile communication network, at least one redistribution factor, each of the at least one redistribution factor corresponding to each of at least one redistribution target, the first cell on which the mobile device is camped; and
   determining whether to stay on the first cell or move to a second cell corresponding to one of the plurality of redistribution targets based on the at least one redistribution factor,
   wherein each of the at least one redistribution indicates a proportion of mobile devices distributed to a third cell, which are intended to camp on the third cell related to a corresponding redistribution target, and
   wherein a redistribution factor for a fourth cell is used by the mobile device in response to the mobile device being located in the fourth cell, and the fourth cell is one of a plurality of cells on a frequency corresponding to the redistribution target.

2. The method of claim 1, further comprising:
   measuring, on a frequency corresponding to each of the plurality of redistribution targets, radio link properties for each cell corresponding to the frequency, and ranking cells corresponding to the plurality of redistribution targets based on the measurement results,
   wherein a redistribution factor for the first cell or the second cell is set as a redistribution factor of a specific cell to be stayed or moved, in response to the first cell or the second cell satisfying a condition based on the ranking of the plurality of cells of the frequency corresponding to that redistribution target, and
   wherein the condition is that the first cell or the second cell is a highest ranked cell among the cells.

3. The method of claim 1, wherein determining whether to stay on the first cell or move to the second cell comprises:
   determining whether to stay on a frequency corresponding to the first cell or move to a frequency corresponding to the second cell,
   and
   wherein each of the at least one redistribution factor comprises one of:
      a redistribution factor for a frequency of the corresponding redistribution target;
      a redistribution factor for the third cell on the frequency of the corresponding redistribution target; or
      a redistribution factor for a set of cells on the frequency of the corresponding redistribution target.

4. The method of claim 1, wherein determining the plurality of redistribution targets comprises:
   identifying, using the information received from the first cell, a plurality of potential targets, each of the plurality of potential targets corresponding to a frequency supported by the mobile device; and
   determining a subset of the plurality of potential targets as the plurality of redistribution targets by performing measurements on at least one cell corresponding to each of the plurality of potential targets to determine whether predetermined radio conditions are satisfied.

5. The method of claim 1, further comprising:
   determining expiration of a timer configured by the mobile device,
   before determining the plurality of redistribution targets,
   wherein the timer is configured to expire when a trigger event occurs,
   wherein the timer is associated with a previous idle mode redistribution evaluation and is set for a period of time, and
   wherein the trigger comprises:
      a network initiate request for performing the idle mode redistribution evaluation,
      the mobile device leaving a previous redistribution target corresponding to the previous idle mode redistribution evaluation, or
      the period of time elapsing.

6. The method of claim 5, further comprising, while the timer is running, ignoring receipt of further information suitable for identifying at least one known redistribution factor; and
   when the timer is determined to have expired, determining the plurality of redistribution targets, when it is determined that the information from within the particular cell of the mobile communication network is received,
   wherein the timer is configured during the previous idle mode redistribution evaluation, and
   wherein the period of time is configured according to one of:
      a value indicated by the first cell that the mobile device is camped on or a fifth cell that the mobile device was camped on during the previous idle mode redistribution evaluation; or
      a value indicated by the first cell that the mobile device is camped on and was moved to as a result of the previous idle mode redistribution evaluation, wherein, upon conclusion of the previous idle mode redistribution evaluation, an end-time of the timer was updated based on the value.

7. The method of claim 1, further comprising starting a new timer configured according to the idle mode redistribution evaluation, in response to determining to perform the determination of the plurality of redistribution targets.

8. The method of claim 1, wherein determining the plurality of redistribution targets comprises:
   determining if a network initiated request is received; and
   in response to determining that the network initiated request is received, determining the plurality of redistribution targets, and
   wherein the network initiated request includes information relating to dispersion in a time domain.

9. The method of claim 1, further comprising:
determining if the mobile device leaves an area of the first cell; and
in response to determining that the mobile device leaves the area of the first cell, determining the plurality of redistribution targets, or moving to a fifth cell that mobile device was previously camped on.

10. The method of claim 1, wherein determining whether to stay on the first cell or move to the second cell comprises:
determining to stay on the first cell or move to the second cell, based on a comparison result of a measured radio link quality of each of the plurality of redistribution targets and a quality threshold.

11. The method of claim 1, further comprising:
determining to move to the second cell;
camping on the second cell; and
starting intra frequency measurements based on a comparison result of a radio link quality for the second cell and a threshold quality.

12. The method of claim 1, wherein determining whether to move to the second cell corresponding to one of the plurality of redistribution targets comprises:
generating a pseudo-random number within a range;
generating a plurality of sub-ranges within the range, wherein a sub-range is generated for each of the plurality of redistribution targets based on a corresponding redistribution factor; and
determining to move to the second cell as a redistribution target corresponding to a sub-range to which the pseudo-random number corresponds.

13. The method of claim 1, wherein information for identifying the at least one redistribution factor is received from one or more cells from among a plurality of cells in the mobile communication network.

14. A mobile device for performing an idle mode redistribution evaluation in a mobile communication network, the mobile device comprising:
a transceiver; and
at least one processor coupled with the r and configured to:
determine a plurality of redistribution targets, each of the plurality of redistribution targets corresponding to a different frequency and comprising at least one cell within which the mobile device can camp on in an idle mode in the mobile communication network,
identify, using information received from a first cell of the mobile communication network, at least one redistribution factor, each of the at least one redistribution factor corresponding to each of at least one redistribution target, the first cell on which the mobile device is camped, and
determine whether to stay on the first cell or move to a second cell corresponding to one of the plurality of redistribution targets based on the at least one redistribution factor,
wherein each of the at least one redistribution factor indicates a proportion of mobile devices distributed to a third cell, which are intended to camp on the third cell related to a corresponding redistribution target, and
wherein a redistribution factor for a fourth cell is used by the mobile device in response to the mobile device being located in the fourth cell, and the fourth cell is one of a plurality of cells on a frequency corresponding to the redistribution target.

15. The mobile device of claim 14, wherein the at least one processor is further configured to control the transceiver to receive information for identifying the at least one redistribution factor from one or more cells from among a plurality of cells in the mobile communication network.

16. The mobile device of claim 14, the at least one processor is further configured to measure, on a frequency corresponding to each of the plurality of redistribution targets, radio link properties for each cell corresponding to the frequency, and ranking cells corresponding to the plurality of redistribution targets based on the measurement results,
wherein a redistribution factor for the first cell or the second cell is set as a redistribution factor of a specific cell to be stayed or moved, in response to the first cell or second cell satisfying a condition based on the ranking of cells of the frequency corresponding to that redistribution target, and
wherein the condition is that the first cell or the second cell is a highest ranked cell among the cells.

17. The mobile device of claim 14, wherein the at least one processor is further configured to determine whether to stay on a frequency corresponding to the first cell or move to a frequency corresponding to the second cell, and
wherein each of the at least one redistribution factor comprises one of:
a redistribution factor for a frequency of the corresponding redistribution target;
a redistribution factor for the third cell on the frequency of the corresponding redistribution target; or
a redistribution factor for a set of cells on the frequency of the corresponding redistribution target.

* * * * *